US007679699B2

(12) United States Patent
Ahn et al.

(10) Patent No.: US 7,679,699 B2
(45) Date of Patent: Mar. 16, 2010

(54) LIQUID CRYSTAL DISPLAY DEVICE AND FABRICATING METHOD THEREOF

(75) Inventors: Byung Chul Ahn, Anyang-si (KR); Byoung Ho Lim, Gumi-si (KR); Jae Jun Ahn, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 958 days.

(21) Appl. No.: 11/168,554

(22) Filed: Jun. 29, 2005

(65) Prior Publication Data

US 2006/0146213 A1 Jul. 6, 2006

(30) Foreign Application Priority Data

Dec. 31, 2004 (KR) ...................... 10-2004-0118597

(51) Int. Cl.
*G02F 1/1335* (2006.01)

(52) U.S. Cl. ...................................................... 349/114

(58) Field of Classification Search ....................... None
See application file for complete search history.

(56) References Cited

U.S. PATENT DOCUMENTS 4,542,960 A 9/1985 Yang
5,162,933 A 11/1992 Kakuda et al.
5,317,433 A 5/1994 Miyawaki et al.
5,339,181 A 8/1994 Kim et al.
5,462,887 A 10/1995 Gluck
5,668,379 A 9/1997 Ono et al.
5,731,856 A 3/1998 Kim et al.
5,771,083 A 6/1998 Fujihara et al.
5,793,460 A 8/1998 Yang
5,847,781 A 12/1998 Ono et al.
5,959,708 A 9/1999 Lee et al.
6,215,542 B1 4/2001 Lee et al.
6,233,034 B1 5/2001 Lee et al.
6,256,081 B1 7/2001 Lee et al.
6,281,953 B1 8/2001 Lee et al.
6,285,428 B1 9/2001 Kim et al.
6,319,760 B1 11/2001 Lee et al.
6,351,300 B1 2/2002 Park et al.

(Continued)

FOREIGN PATENT DOCUMENTS

CN 1290922 4/2001

(Continued)

*Primary Examiner*—David Nelms
*Assistant Examiner*—Lucy P Chien
(74) *Attorney, Agent, or Firm*—McKenna Long & Aldridge LLP

(57) ABSTRACT

A liquid crystal display device, including: first and second substrates; a gate line on the first substrate; a data line crossing the gate line defining a pixel area with a gate insulating film therebetween; a thin film transistor including a gate electrode, a source electrode, a drain electrode, and a semiconductor layer with a channel between the source electrode and the drain electrode; a common line in parallel to the gate line on the first substrate; a common electrode extending from the common line into the pixel area; and a pixel electrode on the gate insulating film in the pixel area, wherein the drain electrode overlaps with the pixel electrode to connect to the pixel electrode; and wherein the semiconductor layer is removed from an area where it overlaps a transparent conductive film.

72 Claims, 32 Drawing Sheets

U.S. PATENT DOCUMENTS

| | | | | |
|---|---|---|---|---|
| 6,362,032 | B1 | 3/2002 | Kim et al. | |
| 6,362,858 | B1 | 3/2002 | Jeon et al. | |
| 6,388,726 | B1 | 5/2002 | Kim et al. | |
| 6,404,470 | B1 | 6/2002 | Kim et al. | |
| 6,429,918 | B1 | 8/2002 | Choi et al. | |
| 6,449,026 | B1 | 9/2002 | Min et al. | |
| 6,456,351 | B1 | 9/2002 | Kim et al. | |
| 6,462,800 | B1 | 10/2002 | Kim et al. | |
| 6,512,503 | B1 | 1/2003 | Kim et al. | |
| 6,562,645 | B2 * | 5/2003 | Sung et al. | 438/30 |
| 6,580,487 | B1 | 6/2003 | Kim et al. | |
| 6,583,842 | B2 | 6/2003 | Hong et al. | |
| 6,678,027 | B2 | 1/2004 | Park et al. | |
| 6,741,311 | B1 | 5/2004 | Hong et al. | |
| 2001/0005238 | A1 | 6/2001 | Yun et al. | |
| 2001/0005251 | A1 | 6/2001 | Kim et al. | |
| 2001/0005597 | A1 | 6/2001 | Shin et al. | |
| 2001/0006765 | A1 | 7/2001 | Lee et al. | |
| 2001/0007779 | A1 | 7/2001 | Lee et al. | |
| 2001/0010576 | A1 | 8/2001 | Lee et al. | |
| 2001/0038370 | A1 | 11/2001 | Yeung | |
| 2001/0048500 | A1 | 12/2001 | Lim et al. | |
| 2001/0048501 | A1 | 12/2001 | Kim et al. | |
| 2002/0008828 | A1 | 1/2002 | Park et al. | |
| 2002/0041354 | A1 | 4/2002 | Noh et al. | |
| 2002/0044248 | A1 | 4/2002 | Park et al. | |
| 2002/0067453 | A1 | 6/2002 | Kim et al. | |
| 2002/0067454 | A1 | 6/2002 | Hong et al. | |
| 2002/0089630 | A1 | 7/2002 | Liu et al. | |
| 2002/0163604 | A1 | 11/2002 | Kim et al. | |
| 2002/0180920 | A1 | 12/2002 | Noh et al. | |
| 2003/0076469 | A1 | 4/2003 | Liu | |
| 2003/0098939 | A1 | 5/2003 | Min et al. | |
| 2003/0117558 | A1 | 6/2003 | Kim et al. | |
| 2003/0133067 | A1 * | 7/2003 | Park et al. | 349/141 |
| 2003/0202140 | A1 | 10/2003 | Liu | |
| 2004/0239838 | A1 * | 12/2004 | Lai | 349/106 |
| 2005/0030451 | A1 | 2/2005 | Liu | |
| 2005/0046775 | A1 | 3/2005 | Lee et al. | |
| 2005/0062923 | A1 | 3/2005 | Lyu et al. | |
| 2005/0068483 | A1 | 3/2005 | Lee et al. | |

FOREIGN PATENT DOCUMENTS

| | | |
|---|---|---|
| CN | 1389756 | 1/2003 |
| CN | 1550857 | 12/2004 |
| CN | 1551367 | 12/2004 |
| JP | 9073101 | 3/1997 |
| JP | 2001183685 | 7/2001 |
| JP | 2001235763 | 8/2001 |

* cited by examiner

LIQUID CRYSTAL DISPLAY DEVICE AND FABRICATING METHOD THEREOF

This application claims the benefit of Korean Patent Application No. P2004-118597 filed in Korea on Dec. 31, 2004, which is hereby incorporated by reference.

BACKGROUND OF THE INVENTION

1. Field of the Invention

This invention relates to a liquid crystal display device, and more particularly to a thin film transistor substrate that uses a horizontal electric field and a fabricating method thereof that simplifies the fabrication process. Also, the present invention is directed to a liquid crystal display panel employing the thin film transistor substrate and a fabricating method thereof that simplifies the fabrication process.

2. Description of the Related Art

Generally, a liquid crystal display (LCD) controls the light transmittance of a liquid crystal having a dielectric anisotropy using an electric field to thereby display a picture. The LCD includes a liquid crystal display panel that displays a picture using a liquid crystal cell matrix and a driving circuit to drive the liquid crystal display panel.

Referring to FIG. 1, a related art liquid crystal display panel includes a color filter substrate 10 and a thin film transistor substrate 20 that are joined to each other with a liquid crystal 24 therebetween.

The color filter substrate 10 includes a black matrix 4, a color filter 6, and a common electrode 8 that are sequentially provided on an upper glass substrate 2. The black matrix 4 with a matrix shape on the upper glass substrate 2. The black matrix 4 divides an area of the upper glass substrate 2 into a plurality of cell areas for the color filter 6 and prevents light interference between adjacent cells and an external light reflections. The color filter 6 is provided in the cell areas defined by the black matrix 4 so as to transmit red, green and blue light. The common electrode 8 is formed from a transparent conductive layer entirely coated onto the color filter 6 and supplies a common voltage Vcom that serves as a reference voltage for driving the liquid crystal 24. Further, an over-coated layer (not shown) for smoothing the color filter 6 may be provided between the color filter 6 and the common electrode 8.

The thin film transistor substrate 20 includes a thin film transistor 18 and a pixel electrode 22 in each cell area defined by a crossing between a gate line 14 and a data line 16 on a lower glass substrate 12. The thin film transistor 18 applies a data signal from the data line 16 to the pixel electrode 22 in response to a gate signal from the gate line 14. The pixel electrode 22 uses a data signal from the thin film transistor 18 to drive the liquid crystal 24.

The liquid crystal 24 having a dielectric anisotropy is rotated in accordance with an electric field formed by a data signal on the pixel electrode 22 and a common voltage Vcom from the common electrode 8 to control light transmittance, thereby implementing a gray scale level.

Further, the liquid crystal display panel includes a spacer (not shown) for fixing a cell gap between the color filter substrate 10 and the thin film transistor substrate 20.

In a liquid crystal display panel, the color filter substrate 10 and the thin film transistor substrate 20 are fabricated by a plurality of mask processes. One mask process may include many processes such as thin film deposition (coating), cleaning, photolithography, etching, photo-resist stripping, inspection processes, etc.

Because the thin film transistor substrate includes semiconductor process that require a plurality of mask processes, it has a complicated fabricating process that results in increased cost for the liquid crystal display panel. Therefore, a thin film transistor substrate has been developed to reduce the number of mask processes.

Liquid crystal displays are largely classified into a vertical electric field and a horizontal electric field LCDs depending upon the direction of the electric field driving the liquid crystal.

A vertical electric field liquid crystal display drives a liquid crystal in a twisted nematic (TN) mode with a vertical electric field formed between a pixel electrode and a common electrode arranged opposite to each other on the upper and lower substrate. The vertical electric field liquid crystal display has an advantage of a large aperture ratio while having a drawback of a narrow viewing angle of about 90°.

The horizontal electric field liquid crystal display drives a liquid crystal in an in plane switch (IPS) mode with a horizontal electric field between the pixel electrode and the common electrode arranged in parallel to each other on the lower substrate. The horizontal electric field liquid crystal display has an advantage of a wide viewing angle of about 160°.

The thin film transistor substrate in the horizontal electric field liquid crystal display also requires a plurality of mask processes including semiconductor processes resulting in a complicated fabricating process. Therefore, in order to reduce the manufacturing cost, it is necessary to reduce the number of mask processes.

SUMMARY OF THE INVENTION

Accordingly, the present invention is directed to a thin film transistor substrate of horizontal electric field applying type and fabricating method thereof, and liquid crystal display panel using the same and fabricating method thereof that substantially obviates one or more of the problems due to limitations and disadvantages of the related art.

An advantage of the present invention is to provide a thin film transistor substrate of horizontal electric field applying type and a fabricating method thereof; and a liquid crystal display panel using the same and a fabricating method thereof that are adaptive for simplifying a process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, including: first and second substrates; a gate line on the first substrate; a data line crossing the gate line defining a pixel area with a gate insulating film therebetween; a thin film transistor including a gate electrode, a source electrode, a drain electrode, and a semiconductor layer with a channel between the source electrode and the drain electrode; a common line in parallel to the gate line on the first substrate; a common electrode extending from the common line into the pixel area; and a pixel electrode on the gate insulating film in the pixel area, wherein the drain electrode overlaps with the pixel electrode to connect to the pixel electrode; and wherein the semiconductor layer is removed from an area where it overlaps a transparent conductive film.

In another aspect of the present invention, a method of fabricating a liquid crystal display device, including: providing first and second substrates; a first mask process of forming a first mask pattern group including a gate line, a gate electrode, a common line, and a common electrode on the first substrate; a second mask process including forming a gate insulating film on the first mask pattern group and a semiconductor layer, defining a pixel hole passing through the semiconductor layer at a pixel area, and forming a pixel electrode in the pixel hole; and a third mask process including forming a source/drain metal pattern including a data line crossing the gate line to define the pixel area, a source electrode connected to the data line, and a drain electrode connected to the pixel electrode on the first substrate, and exposing an active layer of the semiconductor pattern to define a channel between the source electrode and the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Hereinafter, embodiments of the present invention will be described in detail with reference to FIGS. 2 to 18B.

Figure 1:
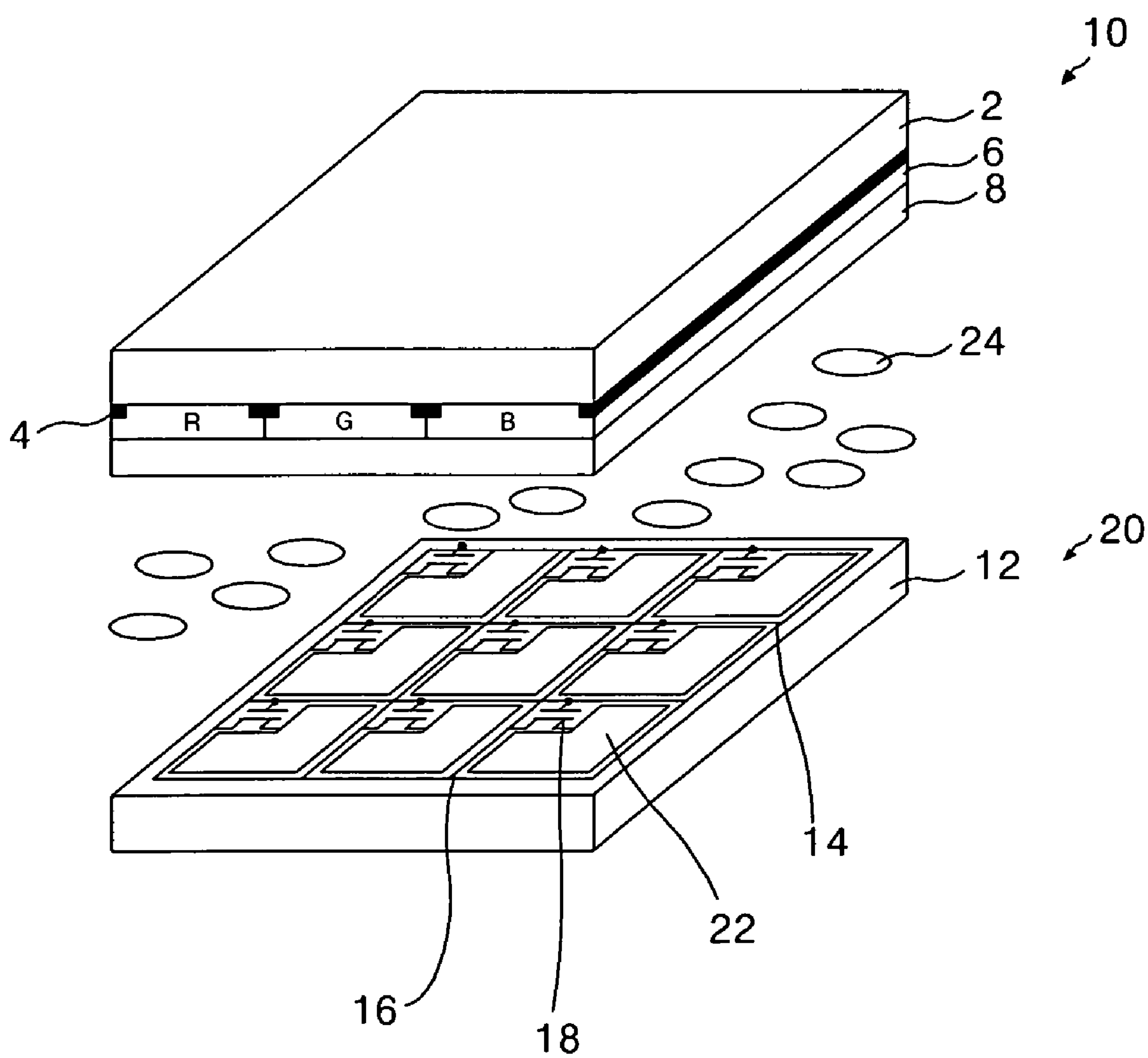
FIG. 1 is a schematic perspective view showing a structure of a related art liquid crystal display panel.
Figure 2:
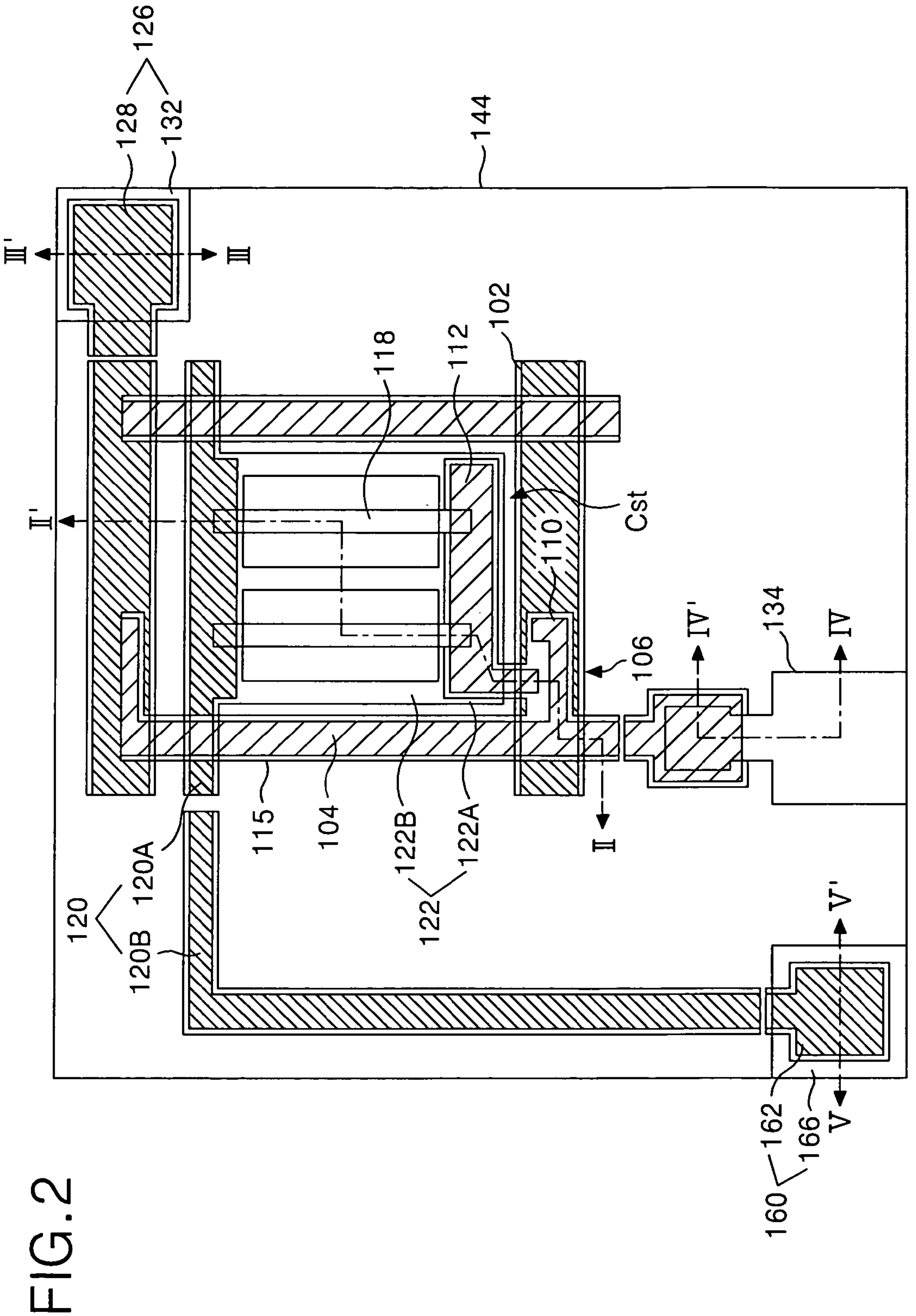
FIG. 2 is a plan view showing a portion of a thin film transistor substrate of horizontal electric field LCD according to a first embodiment of the present invention.
Figure 3A:
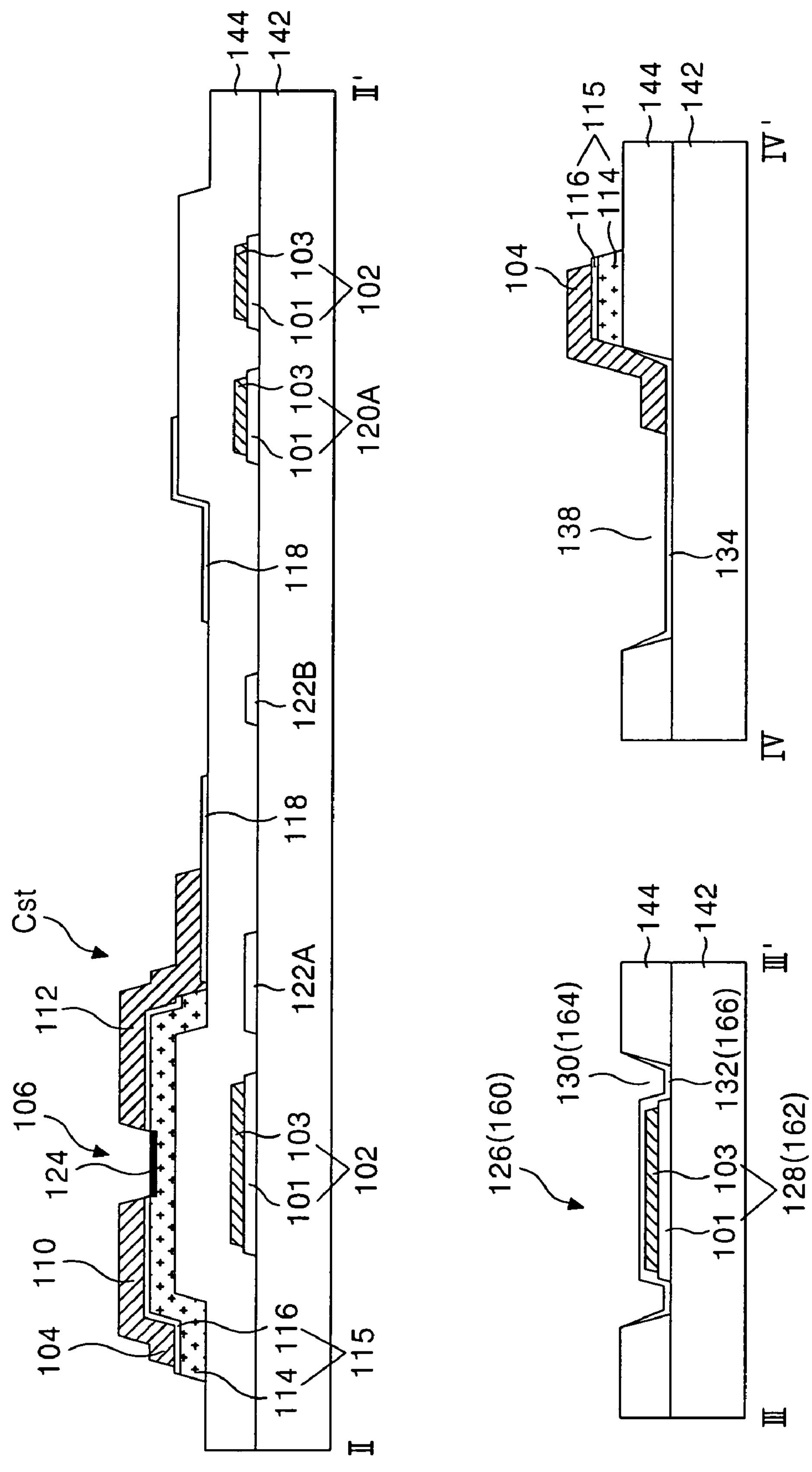
FIG. 3A and FIG. 3B are section views of the thin film transistor substrate taken along the II-II', III-III' and IV-IV' lines in FIG. 2.
Figure 3B:
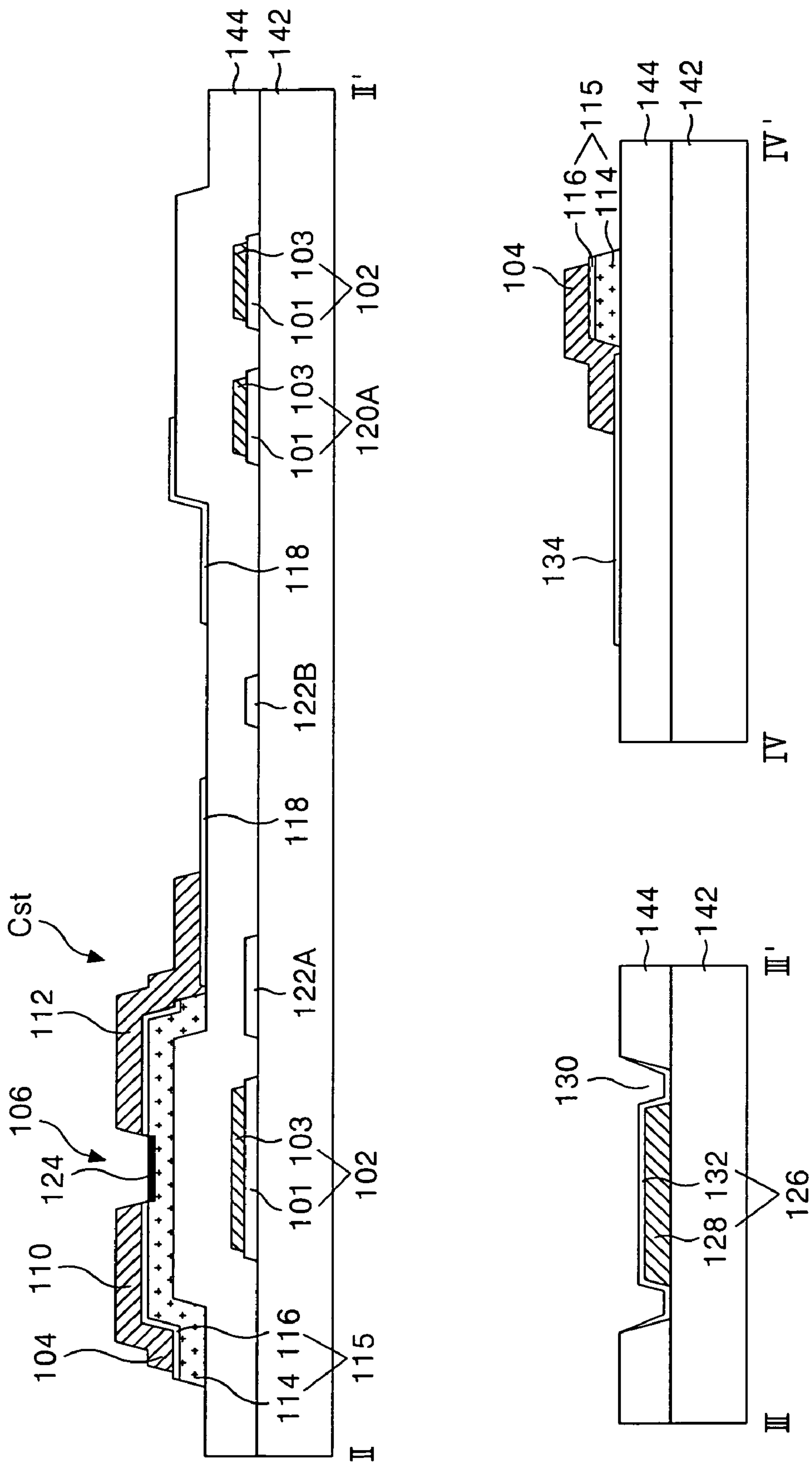

FIG. 2 is a plan view showing a structure of a thin film transistor substrate of a horizontal electric field LCD according to a first embodiment of the present invention, and FIG. 3A and FIG. 3B are section views of the thin film transistor substrate taken along the II-II', III-III' and IV-IV' lines in FIG. 2.

Referring to FIG. 2 to FIG. 3B, the thin film transistor substrate of horizontal electric field LCD includes a gate line 102 and a data line 104 on a lower substrate 142 crossing each other with a gate insulating film 144 therebetween, a thin film transistor 106 connected to the gate line 102 and data line 104 at each crossing, a pixel electrode 118 and a common electrode 122 in the pixel area defined by the crossing of the gate lines 102 and gate line 104 to form a horizontal electric field, a common line 120 connected to the common electrode 122, and a storage capacitor Cst, where the common electrode 122 overlaps the drain electrode 112. Further, the thin film transistor substrate includes a gate pad 126 connected to the gate line 102, and a data pad 134 connected to the data line 104.

The gate line 102 supplies a scanning signal from a gate driver (not shown), while the data line 104 supplies a video signal from a data driver (not shown). The gate line 102 and the data line 104 cross each other with having a gate insulating film 144 therebetween to define the pixel area.

The gate line 102 is formed on the substrate 142 in a multiple-layer structure having at least two gate metal layers including a transparent conductive layer. For instance, the gate line 102 has a double-layer structure in which a first conductive layer 101 has a transparent conductive layer and a second conductive layer 103 made from an opaque metal. The first conductive layer 101 is formed of ITO, TO, IZO or ITZO, etc. while the second conductive layer 103 is formed from Cu, Mo, Al, a Cu alloy, a Mo alloy and an Al alloy, etc. Alternatively, the gate line 102 may be formed only from a single conductive layer like layer 103 above.

The thin film transistor 106 allows a pixel signal applied to the data line 104 to be charged onto the pixel electrode 118 and be kept in response to a scanning signal applied to the gate line 102. The thin film transistor 106 includes a gate electrode included in the gate line 102, a source electrode 110 connected to the data line 104, a drain electrode 112 positioned opposite to the source electrode 110 connected to the pixel electrode 118, an active layer 114 overlapping with the gate line 102 with the gate insulating film 144 therebetween to provide a channel between the source electrode 110 and the drain electrode 112, and an ohmic contact layer 116 formed on the active layer 114 outside the channel area to make an ohmic contact with the source electrode 110 and the drain electrode 112.

Further, a semiconductor layer 115 including the active layer 114 and the ohmic contact layer 116 overlaps data line 104.

The common line 120 and the common electrode 122 supply a reference voltage to drive the liquid crystal, i.e., a common voltage to each pixel.

The common line 120 includes an internal common line 120A in parallel to the gate line 102 in the display area, and an external common line 120B connected to the internal common line 120A in an non-display area. The common line 120 has a multiple-layer structure in which the first and second conductive layers 101 and 103 are disposed on the substrate 150 along with the above-mentioned gate line 102. Alternatively, the common line 120 may be formed only from the second conductive layer 103 instead of the above-mentioned multiple-layer structure.

The common electrode 122 is within the pixel area connected to the internal common line 120A. More specifically, the common electrode 122 may include a horizontal part 122A overlapping with the drain electrode 112 adjacent to the gate line 102, and a finger part 122B extending from the horizontal part 122A into the pixel area connected to the internal common line 120A. The common electrode 122 is formed from the first conductive layer of the common line 120, i.e., a transparent conductive layer.

In the storage capacitor Cst, the first horizontal part 122A of the common electrode 122 overlaps with the drain electrode 112 with the gate insulating film 152 and the semiconductor layer 115 therebetween. The drain electrode 112 overlaps with the first horizontal part 122A of the common electrode 122 as much as possible. Thus, the capacitance value of the storage capacitor Cst is increased by a large overlapping area between the common electrode 122 and the pixel electrode 118, so that the storage capacitor Cst allows a video signal charged in the pixel electrode 118 to be stably maintained until the next signal is applied.

The pixel electrode 118 is provided and exposed on the gate insulating film 144 to be parallel to the finger part 122B of the common electrode 122. Further, the pixel electrode 118 protrudes into the drain electrode 112 to be connected to the drain electrode 112, and also, the pixel electrode 118 protrudes so as to overlap with the common line 120A. In this case, the semiconductor layer 115 is not in an overlapping area between the drain electrode 112 and the pixel electrode 118. If a video signal is applied, via the thin film transistor 106, to the pixel electrode 118, then a horizontal electric is formed between the pixel electrode 118 and the finger part 122B of the common electrode 122 supplied with the common voltage. Liquid crystal molecules arranged in the horizontal direction between the thin film transistor array substrate and the color filter array substrate by such a horizontal electric field are rotated due to a dielectric anisotropy. The light transmittance in the pixel area varies depending upon a rotation of the liquid crystal molecules, thereby implementing a gray level scale.

Further, the finger part 122B of the common electrode 122 and the pixel electrode 118 may be formed in a zigzag shape. Also, the data line may be formed in a zigzag shape along the finger part 122B of the adjacent common electrode 122.

The gate line 102 receives a scanning signal from a gate driver via the gate pad 126. The gate pad 126 includes a lower gate pad electrode 128 extending from the gate line 102, and an upper gate pad electrode 132 within a first contact hole 130 passing through the gate insulating film 144 to connect to the lower gate pad electrode 128. Herein, the upper gate pad electrode 132, along with the pixel electrode 118, is formed from a transparent conductive layer, and s with the edge of the gate insulating film 144 enclosing the first contact hole 130.

The common line 120 receives a common voltage from a common voltage generator via the common pad 160. The common pad 160 has the same vertical structure as the gate pad 126. In other words, the common pad 160 includes a lower common pad electrode 162 extending from the common line 120, and an upper common pad electrode 166 within a second contact hole 164 passing through the gate insulating film 144 to be connected to the lower common pad electrode 162. The upper common pad electrode 166, along with the pixel electrode 118, is formed from a transparent conductive layer and s with the edge of the gate insulating film 144 enclosing the second contact hole 164.

The data line 104 receives a pixel signal from a data driver via a data pad 134. The data pad 134 is formed from a transparent conductive layer within a third contact hole 138 passing through the gate insulating film 144 along with the upper gate pad electrode 132 as shown in FIG. 3A. The third contact hole 138 provided with the data pad 134 extends so as to overlap with a portion of the data line 104. Thus, the data line 104 protrudes from the overlap between it and the semiconductor layer 115 into the third contact hole 138 to be connected to the extended portion of the data pad 134. Otherwise, the data pad 134 is formed from a transparent conductive layer on the gate insulating film 144 and extends so as to overlap with the data line 104 as shown in FIG. 3B. Thus, the data line protrudes from an overlap between it and the semiconductor layer 115 toward the extended area of the data pad 134 to be connected to the data pad 134.

Figure 4:
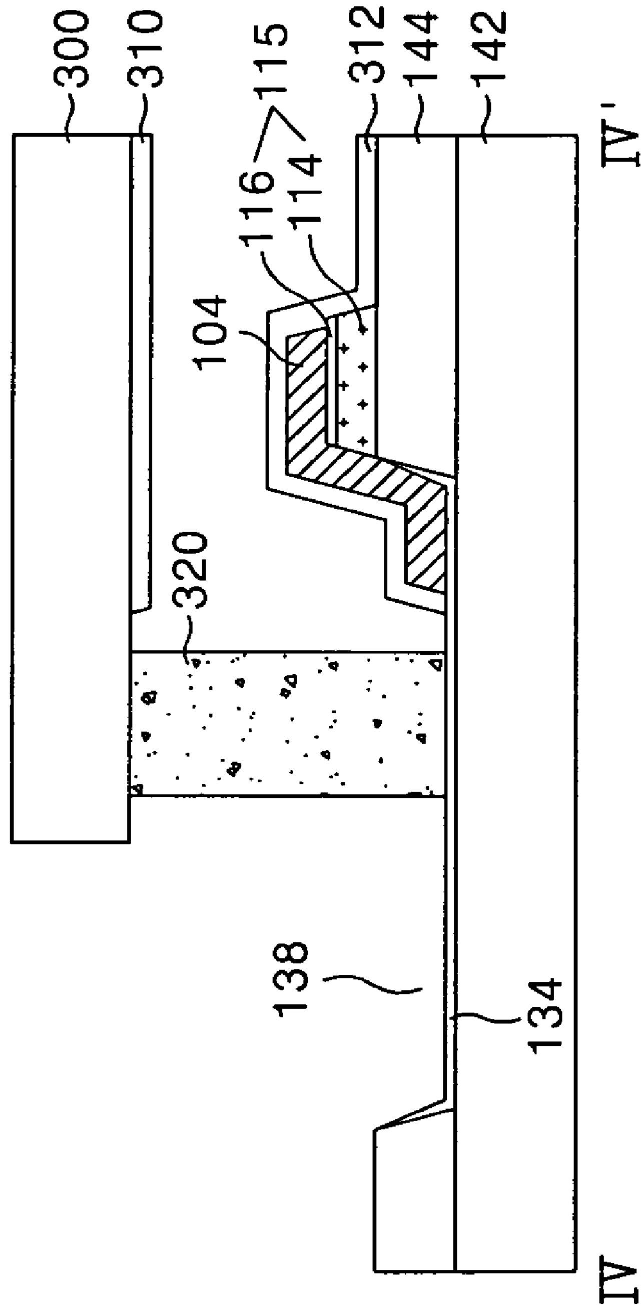
FIG. 4 is a section view showing a data pad area of a liquid crystal display panel employing the thin film transistor substrate of horizontal electric field LCD shown in FIG. 3.

In this case, the data line 104 is exposed due to an absence of the protective film. In order to prevent the data line 104 from being exposed and oxidized, as shown in FIG. 4, the extending portion of the data pad 134 and the connecting portion of the data line 104 are positioned within an area sealed by a sealant 320. Thus, the data line 104 positioned at the sealed area is protected by a lower alignment film 312 coated thereon.

Referring to FIG. 4, a thin film transistor substrate coated with the lower alignment film 312 and a color filter substrate 300 coated with an upper alignment film 310 are joined to each other by the sealant 320, and a cell gap between two substrates sealed by the sealant 320 is filled with a liquid crystal. The upper and lower alignment films 310 and 312 are coated with an organic insulating material in a display area of the two substrates. The sealant 320 is placed so as to not be in contact with the upper and lower alignment films 310 and 312 to reinforce the adhesion between the sealant 320 and the substrates. Thus, the data line 104, the source electrode 110, and the drain electrode 112 are within an area sealed by the sealant 320, so that it may be sufficiently protected by the lower alignment film 312 coated thereon as well as by the liquid crystal in the sealed area.

As described above, in the thin film transistor substrate according to the first embodiment of the present invention, a transparent conductive pattern including the pixel electrode 118, the upper gate pad electrode 132, the upper common pad electrode 166, and the data pad 140 are formed by an etching process using a photo-resist pattern used to define the pixel hole 170 and the contact holes 130, 164 and 138 passing through the gate insulating film 144. Thus, the transparent conductive pattern is provided on the gate insulating film 144, borders with the gate insulating film 144 enclosing the corresponding hole.

Further, the semiconductor layer 115 is patterned in similarity to the gate insulating film 144 and then has an exposure portion removed upon formation of a source/drain metal pattern including the data line 104, the source electrode 110, and the drain electrode 112. Further, upon formation of the source/drain metal pattern, the active layer 114 is exposed to define a channel in the thin film transistor 106. Thus, the semiconductor layer 115 has a structure formed only at the channel between the source electrode 110 and the drain electrode 112 and in an area where the transparent conductive pattern does not exist in the overlapping area between the source/drain metal pattern and the gate insulating film 144. Further, a surface layer 124 of the exposed active layer 114 is treated by plasma, so that the active layer 114 of the channel area may be protected by the surface layer 124 oxidized by $SiO_2$.

The thin film transistor substrate of horizontal electric field LCD according to the first embodiment of the present invention having the above-mentioned structure is formed by the following three-step mask process.

Figure 5A:
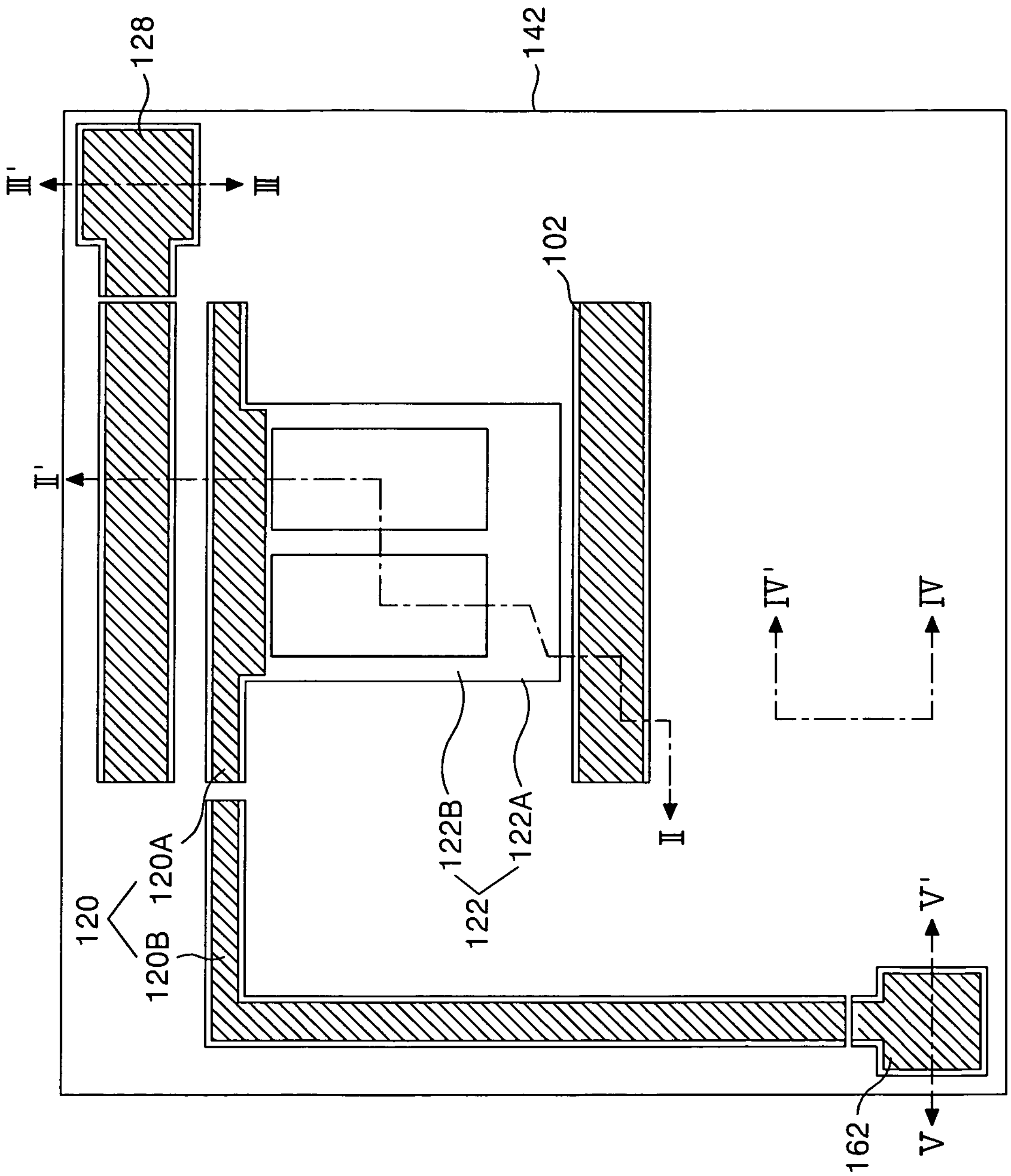
FIG. 5A and FIG. 5B are a plan view and a section view for explaining a first mask process in a method of fabricating the thin film transistor substrate of horizontal electric field LCD according to the embodiment of the present invention, respectively.
Figure 5B:
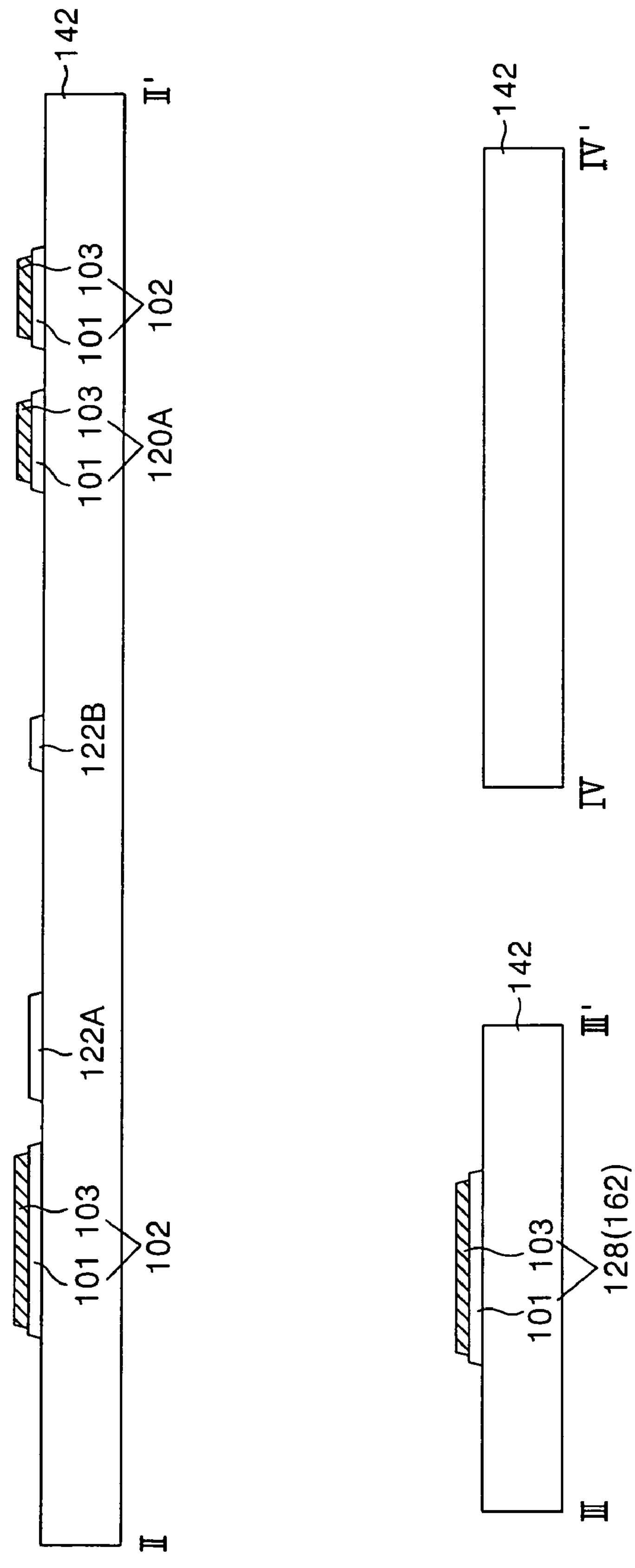
Figure 6A:
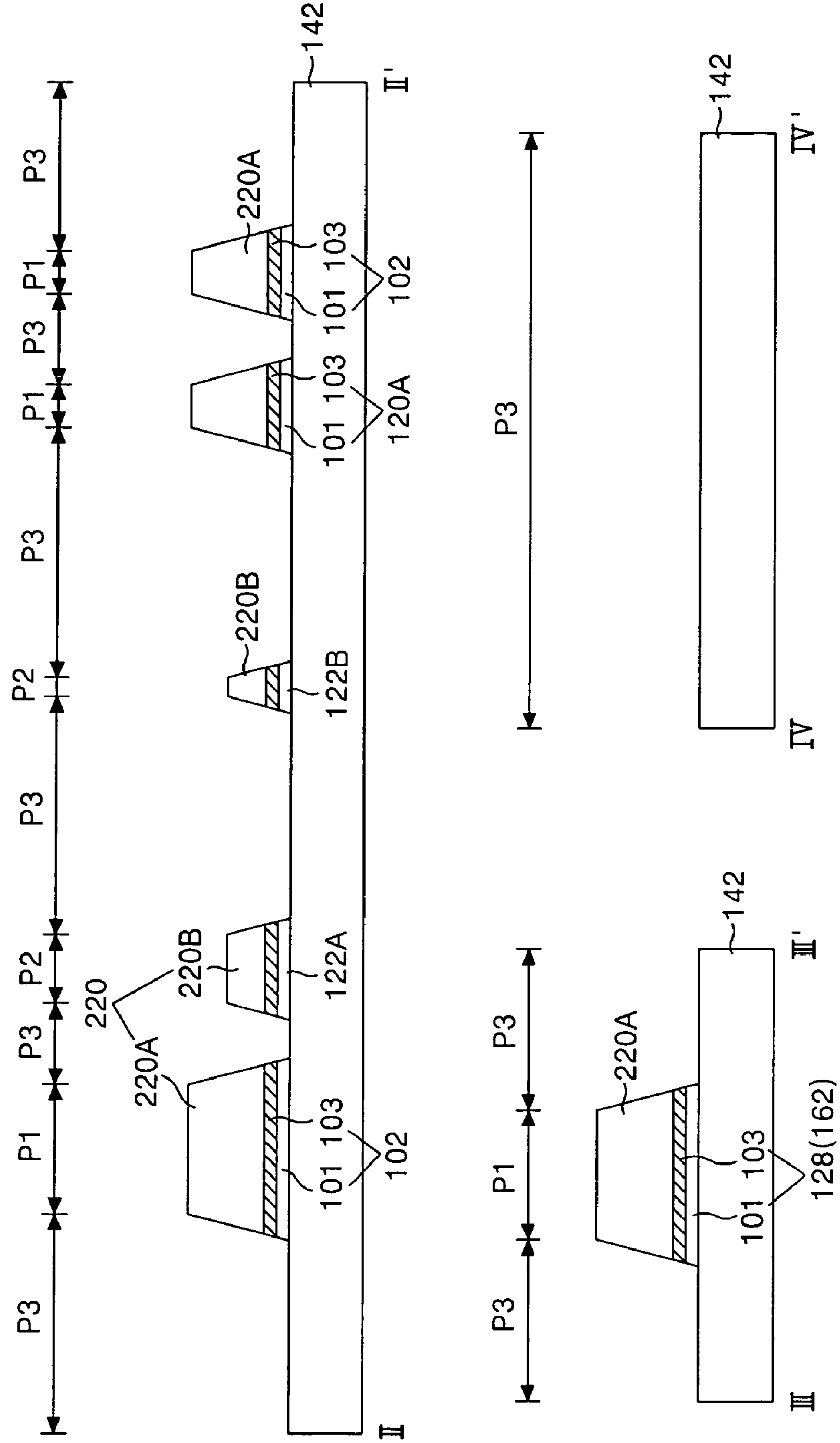
FIG. 6A to FIG. 6C are section views for specifically explaining the first mask process.
Figure 6B:
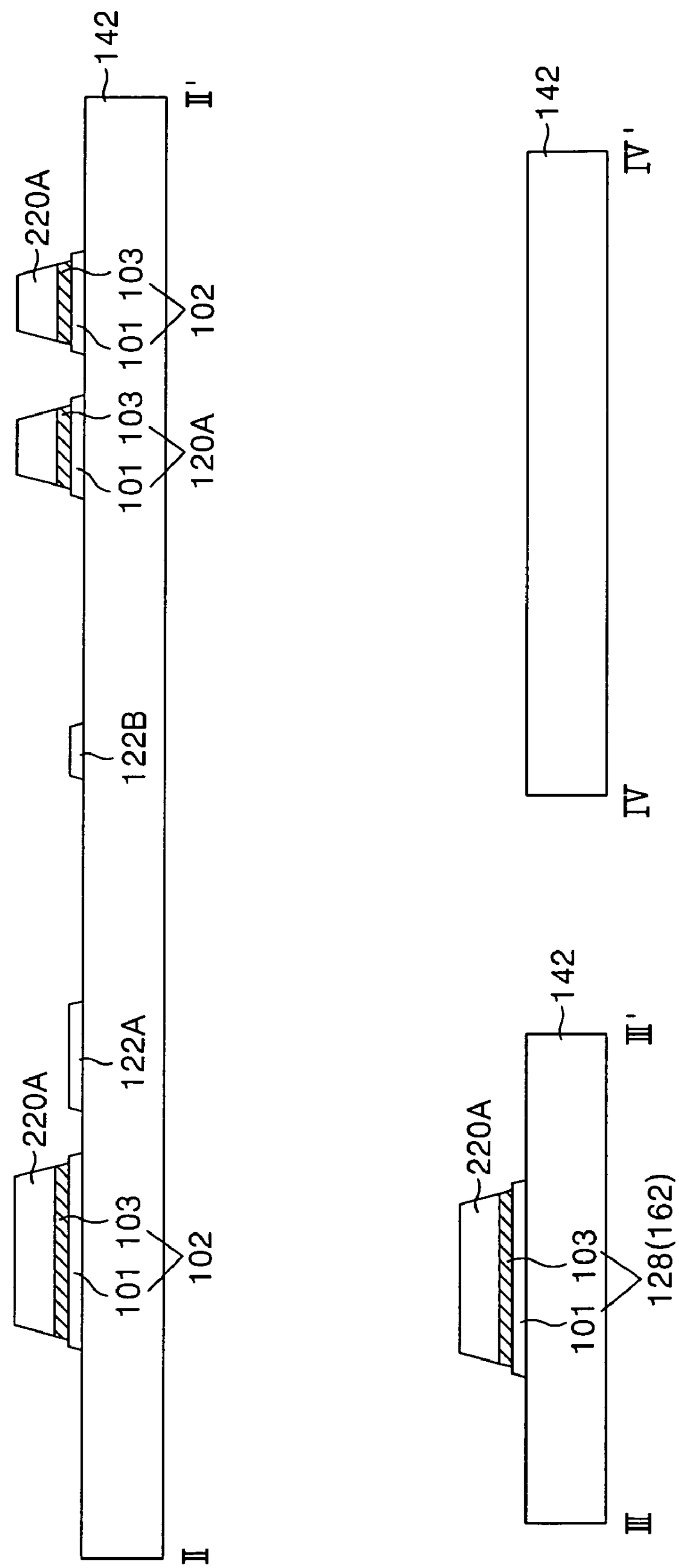
Figure 6C:
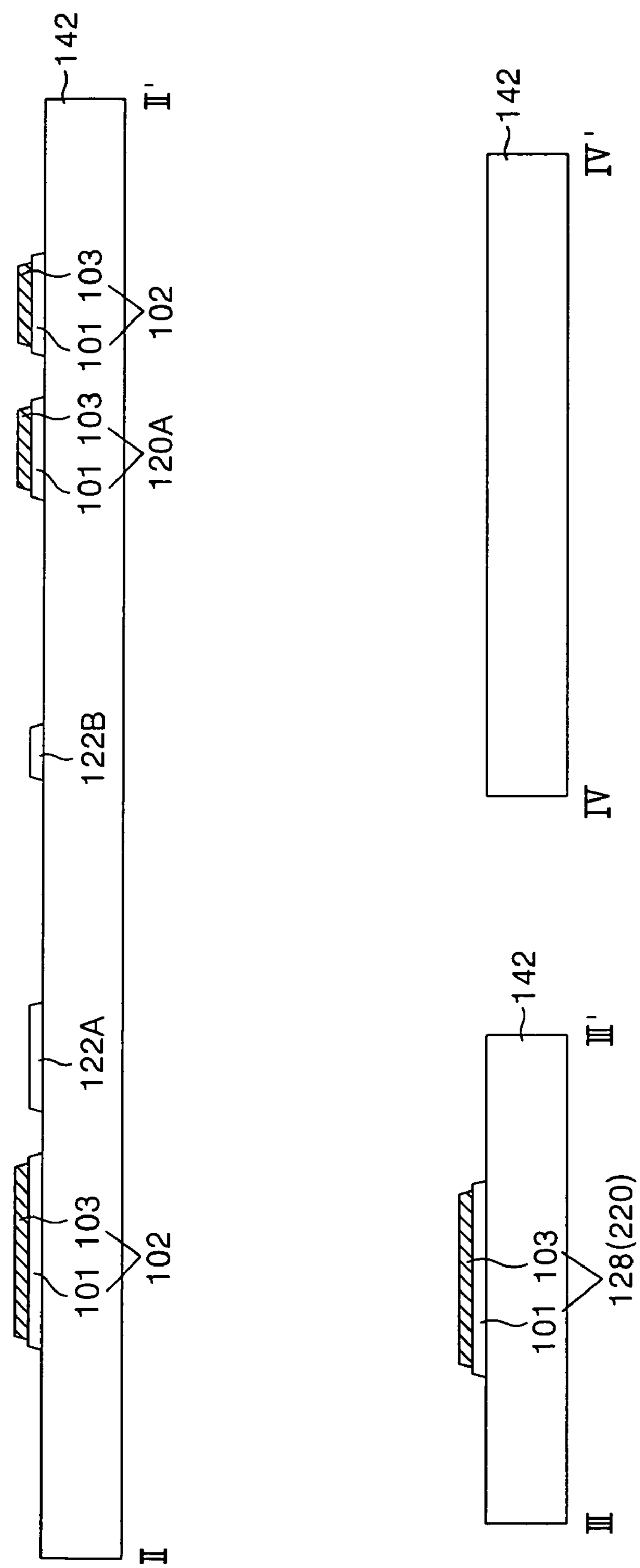

FIG. 5A and FIG. 5B are a plan view and a section view showing a first mask process, respectively, in a method fabricating the thin film transistor substrate of horizontal electric field LCD according to the embodiment of the present invention, and FIG. 6A to FIG. 6C are section views for specifically explaining the first mask process.

A first mask pattern group including the gate line 102, the lower pad electrode 126, the common line 120, the common electrode 128 and the lower common pad electrode 128 is formed on the lower substrate 142 by the first mask process. Herein, the first mask pattern group other than the common electrode 128 has a multiple-layer structure including at least two conductive layers. But, for explanation convenience sake, there will be described only a two-layer structure having the first and second conductive layers 101 and 103. The common electrode 122 has a single-layer structure of the first conductive layer 101 that is a transparent conductive layer. The first mask pattern group having the multiple-layer structure and the single-layer structure is formed by a single mask process using a partial transmitting mask such as a diffractive exposure mask or a half tone mask, etc.

Referring to FIG. 6A, the first and second conductive layers 101 and 103 are disposed on the lower substrate 142 by a deposition technique such as the sputtering, etc. The first conductive layer 101 is formed from a transparent conductive material such as ITO, TO, IZO or ITZO, etc. On the other hand, the second conductive layer 103 employs a single layer made from a metal material such as Mo, Ti, Cu, AlNd, Al, Cr, a Mo alloy, a Cu alloy or an Al alloy, etc., or has a layered structure with at least two layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo alloy, Mo-alloy/Al, Al-alloy/Mo-alloy, Mo-alloy/Al-alloy, Mo/Al alloy, Cu/Mo alloy Cu/Mo(Ti) or Cu/Mo(Ti), etc.

Subsequently, a first photo-resist pattern 220 including photo-resist patterns 220A and 220B having different thicknesses is formed by photolithography using the partial transmitting mask. The partial transmitting mask is comprised of a shielding part for shielding ultraviolet rays, a partial transmitting part for diffracting the ultraviolet rays using a slit pattern or partially transmitting the ultraviolet rays using a phase-shifting material, and a full transmitting part for fully transmitting the ultraviolet rays. The first photo-resist pattern 220 including different thickness photo-resist patterns 220A and 220B and an open area is formed by the photolithography using the partial transmitting mask. In this case, a relatively thick photo-resist pattern 220A is provided at a shielding area P1 overlapping with the shielding part of the partial transmitting mask; the photo-resist pattern 220B thinner than the photo-resist pattern 220A is at a partial exposure area P2 overlapping with the partial transmitting part; and the aperture part is over a full exposure area P3 that overlaps the full transmitting part.

Further, the exposed portions of the first and second conductive layers 101 and 103 are etched by an etching process using the first photo-resist pattern 220 as a mask, thereby providing the first mask pattern group including a double-layer structure of the gate line 102, the lower gate pad electrode 126, the common line 120, the common electrode 122 and the lower common pad electrode 128.

Referring to FIG. 6B, the thickness of the photo-resist pattern 220A is reduced and the photo-resist pattern 220B is removed by an ashing process using an oxygen (O2) plasma. Further, the second conductive layer 103 on the common electrode 122 is removed by an etching process using the ashed photo-resist pattern 220A as a mask. In this case, each side of the patterned second conductive layer 103 is again etched along the ashed photo-resist pattern 220A, thereby allowing the first and second conductive layers 101 and 103 to have a step shape. Accordingly, when the side surfaces of the first and second conductive layers 101 and 103 have a steep inclination, it becomes possible to prevent flaws in the gate insulating film 152 that may be caused thereby.

Referring to FIG. 6C, the photo-resist pattern 220A left on the first mask pattern group in FIG. 6B is removed by the stripping process.

Figure 7A:
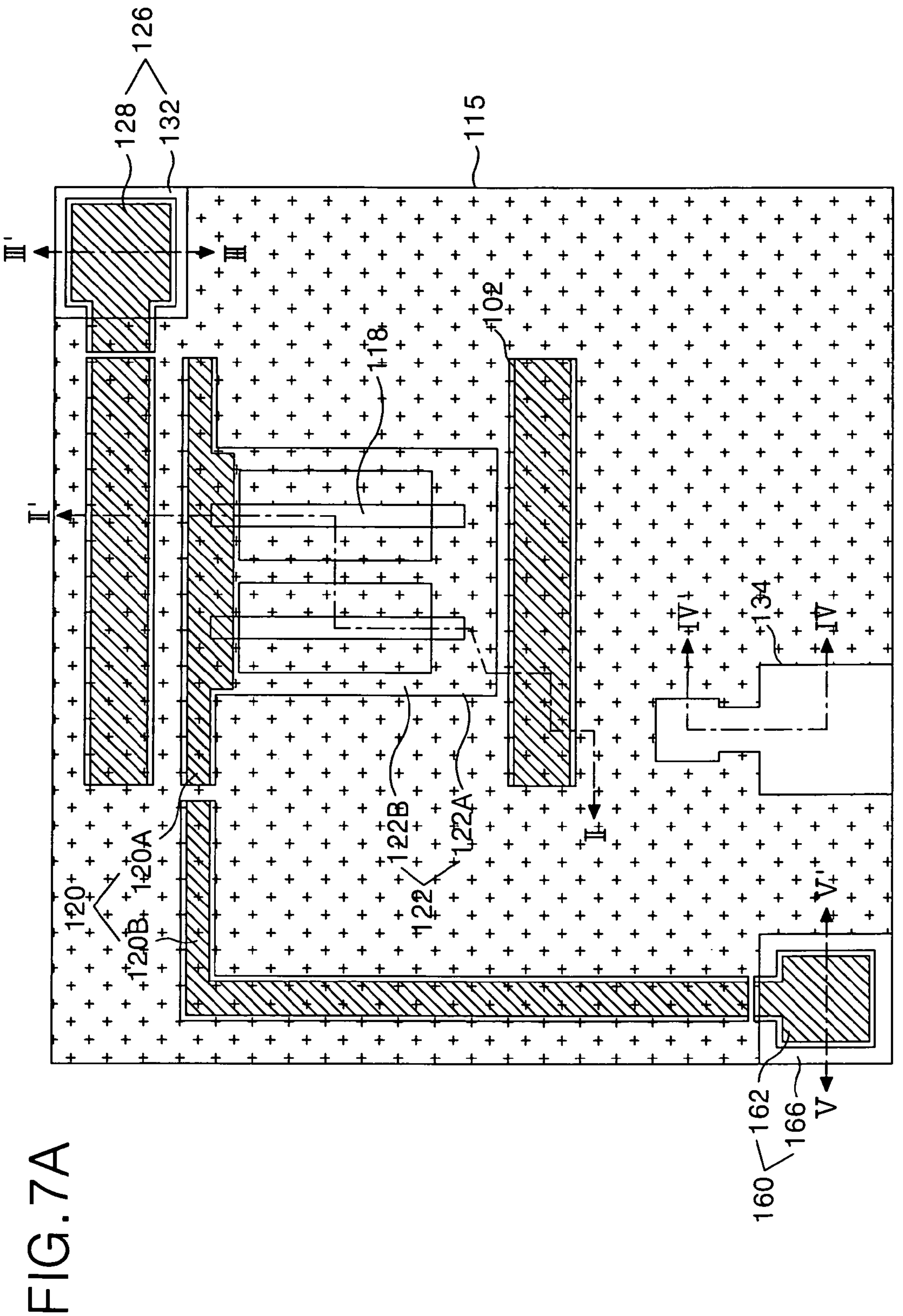
FIG. 7A and FIG. 7B are a plan view and a section view for explaining a second mask process in a method of fabricating the thin film transistor substrate of horizontal electric field LCD according to the embodiment of the present invention, respectively.
Figure 7B:
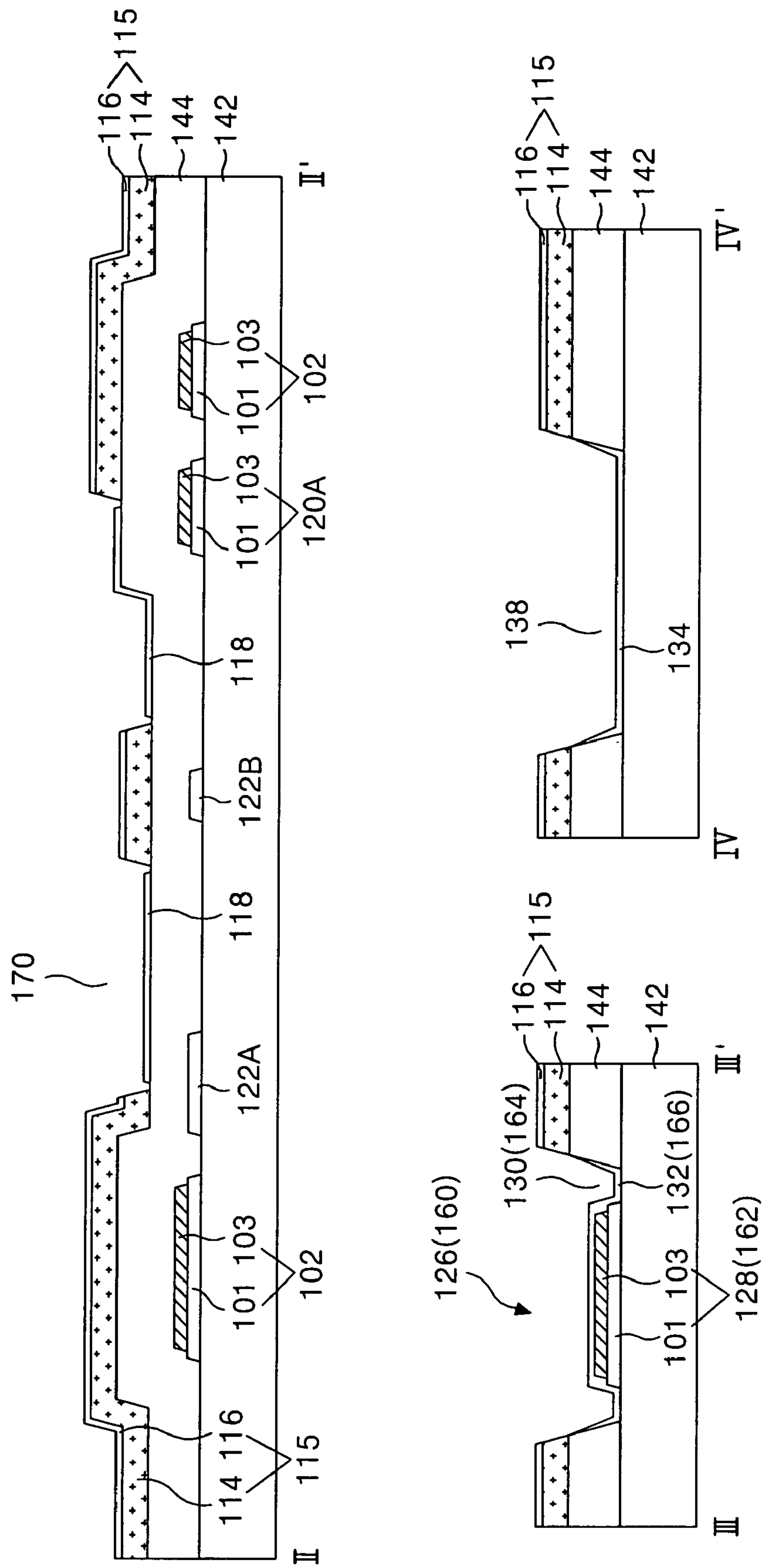

FIG. 7A and FIG. 7B are a plan view and a section view showing a second mask process for fabricating the thin film transistor substrate of a horizontal electric field LCD according to the present invention, respectively, and FIG. 8A to FIG. 8D are section views for specifically showing the second mask process.

The semiconductor layer 115 including the gate insulating film 144, the active layer 114, and the ohmic contact layer 116 is on the lower substrate 142 provided with the first mask pattern group, and a pixel hole 170 passing through the semiconductor layer 115 and the first to third contact holes 130, 164 and 138 passing through the gate insulating film 144 are defined by the second mask process. Further, a transparent conductive pattern including the pixel electrode 118, the upper gate and common pad electrodes 132 and 166, and the data pad 134 is formed within the corresponding hole. Herein, the pixel hole 170 and the first to third contact holes 130, 164 and 138 having different depths are defined by a single mask process employing a partial transmitting mask such as a diffractive exposure mask or a half tone mask, etc.

Figure 8A:
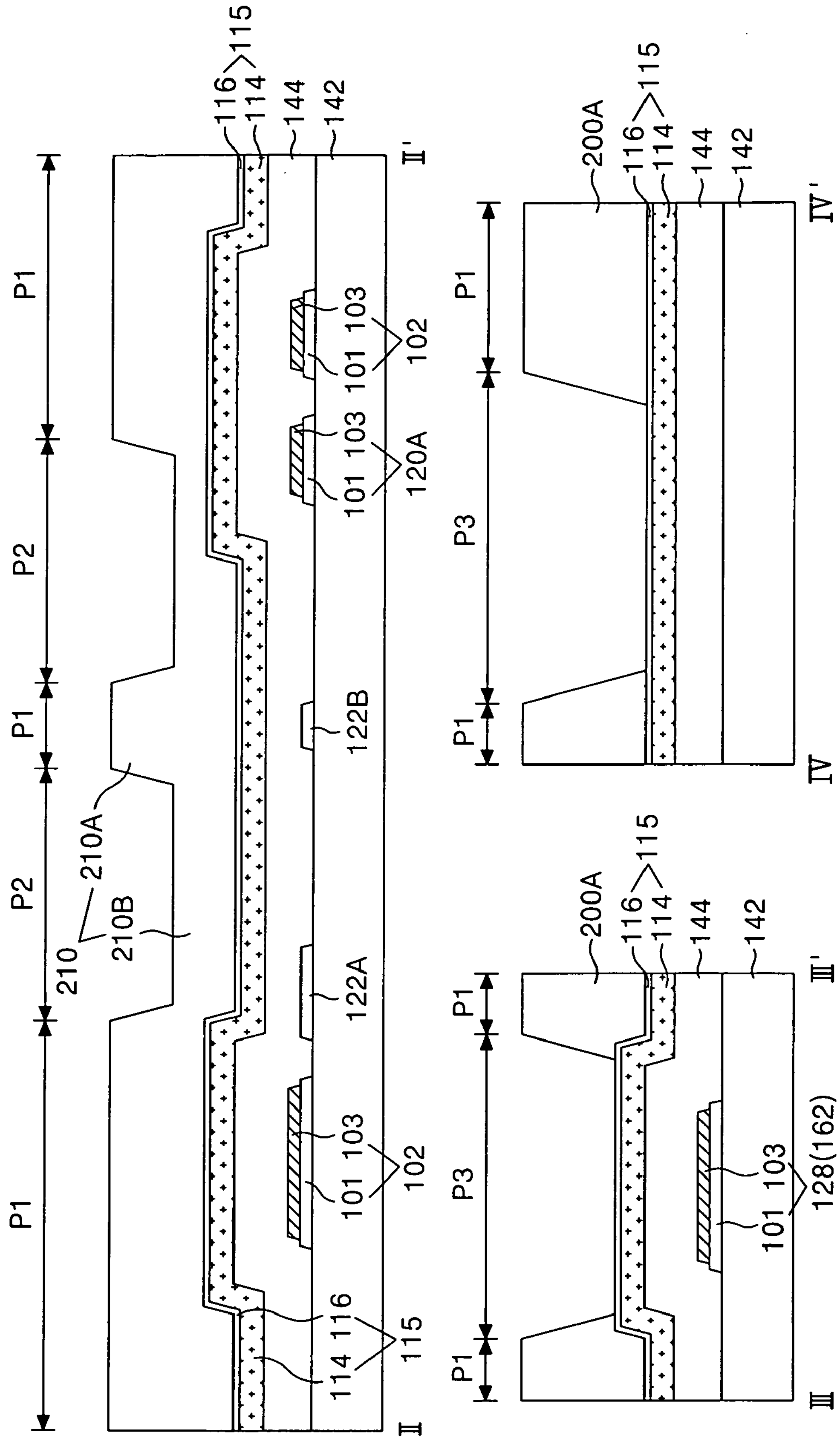
FIG. 8A to FIG. 8D are section views for showing the second mask process.

Referring to FIG. 8A, the gate insulating film 144 and the semiconductor layer 115 including the active layer 114 and the ohmic contact layer 116 are sequentially formed on the lower substrate 142 provided with the first mask pattern group by a deposition technique such as PECVD, etc. The gate insulating film 144 is formed from an inorganic insulating material such as silicon nitride ($SiN_x$) or silicon oxide ($SiO_x$), whereas the active layer 114 and the ohmic contact layer 116 are formed from an amorphous silicon or an amorphous silicon doped with an $n^+$ or $p^+$ impurity.

Subsequently, a first photo-resist pattern 200 including photo-resist patterns 200A and 200B having different thicknesses is formed on the ohmic contact layer 116 by photolithography using the partial transmitting mask. The partial transmitting mask is comprised of a shielding part that shields ultraviolet rays, a partial transmitting part that diffracts the ultraviolet rays using a slit pattern or partially transmitting the ultraviolet rays using a phase-shifting material, and a full transmitting part that fully transmits the ultraviolet rays. The first photo-resist pattern 200 having different thickness photo-resist patterns 200A and 200B and an open part is formed by the photolithography using the partial transmitting mask. In this case, a relatively thick photo-resist pattern 200A is at the shielding area P1 overlapping with the shielding part of the partial transmitting mask; the photo-resist pattern 200B that is thinner than the photo-resist pattern 200A is at a partial exposure area P2 overlapping with the partial transmitting part; and the aperture part is at a full exposure area P3 overlapping with the full transmitting part.

Figure 8B:
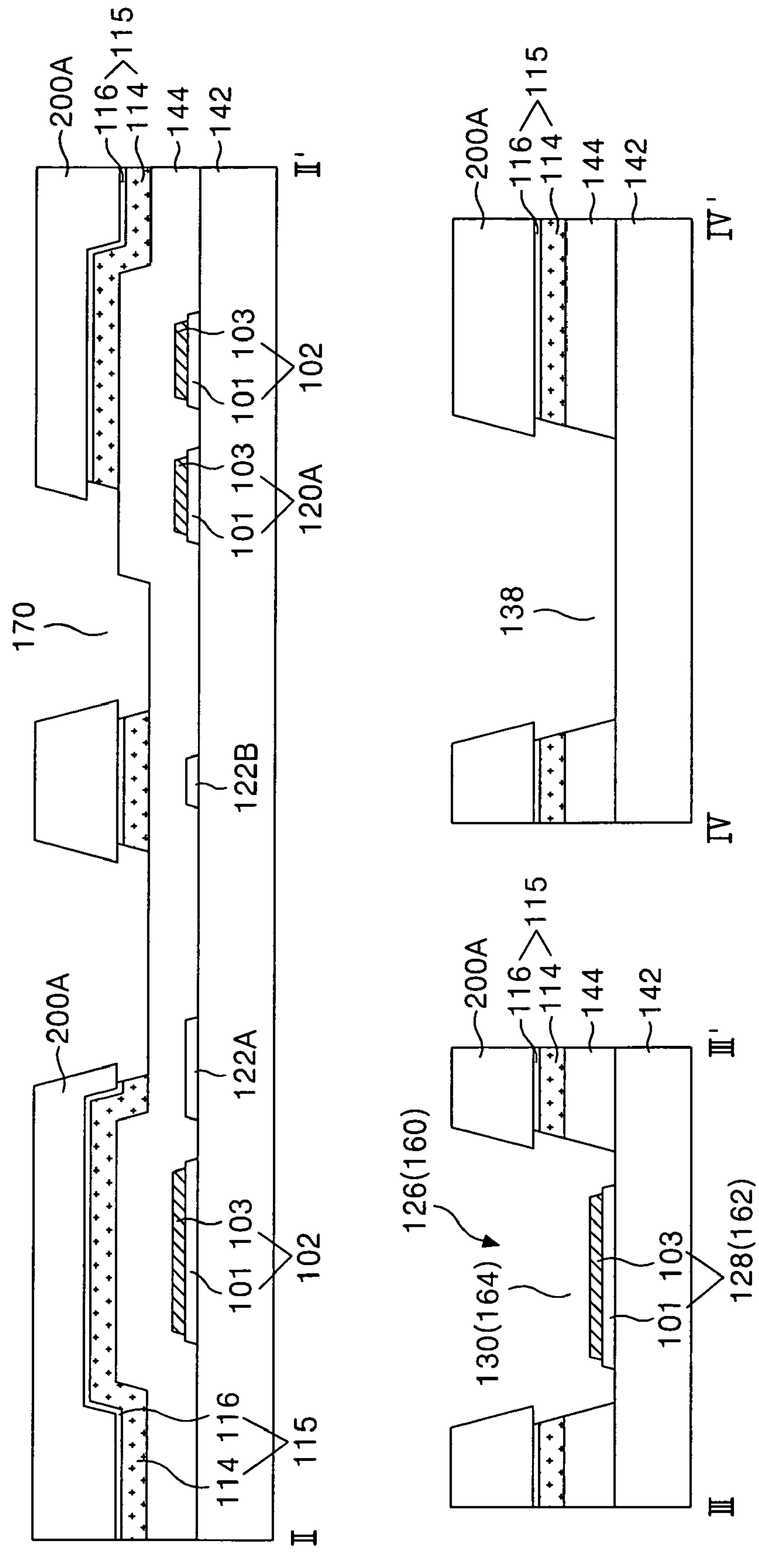

Referring to FIG. 8B, the pixel hole 170 passing through the semiconductor layer 115 and the first to third contact holes 130, 164, and 138 passing through the gate insulating film 144 are formed by the etching process using the first photo-resist pattern 200.

For instance, the semiconductor layer 115 and the gate insulating film 144 exposed through the first photo-resist pattern 200 are etched by a dry etching process to thereby define the first to third contact holes 130, 164, and 138. The first photo-resist pattern 200 also is ashed by a dry etching process, so that the photo-resist pattern 200A is reduced, and the photo-resist pattern 200B, along with the semiconductor pattern 115 under it, is removed, thereby defining the pixel hole 170. Particularly, the semiconductor pattern 115 and the gate insulating film 144 are over-etched in comparison to the ashed photo-resist pattern 200A by an isotropic dry etching technique. Thus, the edges of the pixel hole 170 and the first to third contact holes 130, 164 and 138 are positioned inside and under the edge of the ashed photo-resist pattern 200A.

Alternatively, the first to third contact holes 130, 164, and 138 are formed by the dry etching process using the first photo-resist pattern 200, and then the thickness of the photo-resist pattern 200A is reduced, and the photo-resist pattern 200B is removed by the ashing process. Next, the pixel hole 170 passing through the semiconductor layer 115 is formed by the wet etching process using the ashed photo-resist pattern 200A. An etching rate of the semiconductor layer 115 is larger than that of the gate insulating film 144, so that the semiconductor layer 115 is over-etched in comparison to the ashed photo-resist pattern 200A.

Accordingly, the pixel hole 170 parallel to the finger part 122B of the common electrode 122 exposes the gate insulating film 144; the third contact hole 138 exposes the substrate 142; and the first and second contact holes 130 and 164 expose the lower gate and common pad electrodes 128 and 162 and the substrate 142 at the edges thereof. The first and second contact holes 130 and 164 may be formed in such a manner to expose only the lower gate and common pad electrodes 128 and 162. On the other hand, when the third contact hole 138 is formed by the partial exposure mask like the pixel hole 170, the third contact hole 138 may have a structure in which the semiconductor layer 115 is removed to expose the gate insulating film 144.

Figure 8C:
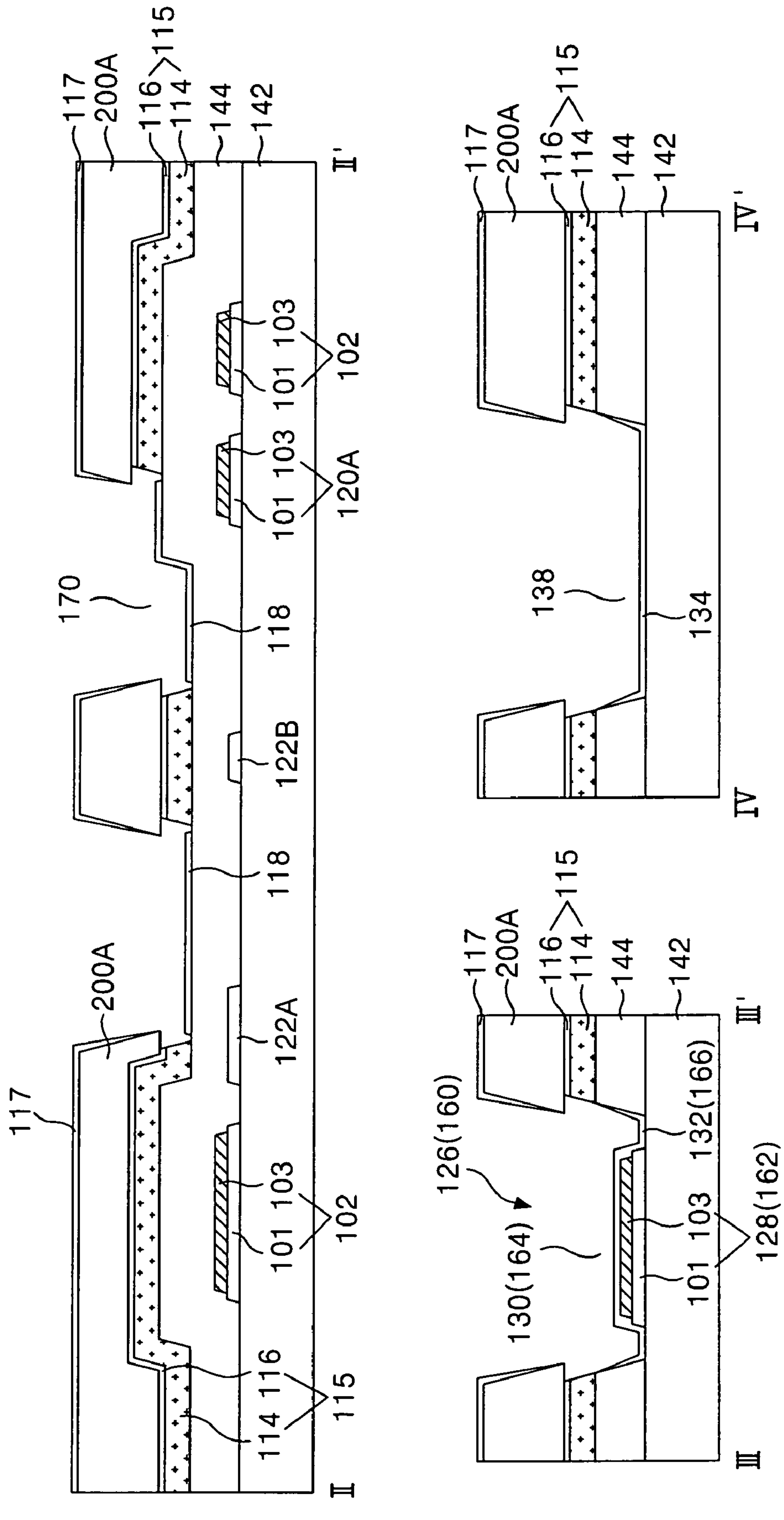

Referring to FIG. 8C, the transparent conductive layer 117 is formed on the entire substrate 142 provided with the photo-resist pattern 200A by a deposition technique such as sputtering, etc. The transparent conductive layer 117 is made from ITO, TO, IZO or ITZO, etc. Thus, the pixel electrode 118 is formed within the pixel hole 170; the upper gate and common pad electrodes 132 and 166 are formed within the first and second contact holes 130 and 164, respectively; and the data pad 134 is formed within the third contact hole 138. The transparent conductive pattern has an opening near the edges of the pixel hole 170 and the first to third contact holes 130, 164, and 138 and the edge of the photo-resist pattern 200A. Further, the pixel electrode 118 is in contact with or is spaced apart from the semiconductor layer 115 enclosing the pixel hole 170. The pixel electrode 118 is provided along with the pixel hole 170 so as to overlap with the horizontal part 122A of the common electrode 122 and a portion of the common line 120A. The upper gate and common pad electrodes 132 and 166 and the data pad 134 are formed within the first to third contact holes 130, 164, and 138 to border with the gate insulating film 144. When the third contact hole 138 is formed by removing only the semiconductor layer 115 by the partial exposure, the data pad 134 is formed on the gate insulating film 144 so as to be in contact with or spaced apart from the semiconductor layer 115 as shown in FIG. 8C. Accordingly, a stripper may infiltrate between the photo-resist pattern 200A and the ohmic contact layer 116 to facilitate the process of removing the photo-resist pattern 200A coated with the transparent conductive film 117, thereby improving the removal efficiency.

Figure 8D:
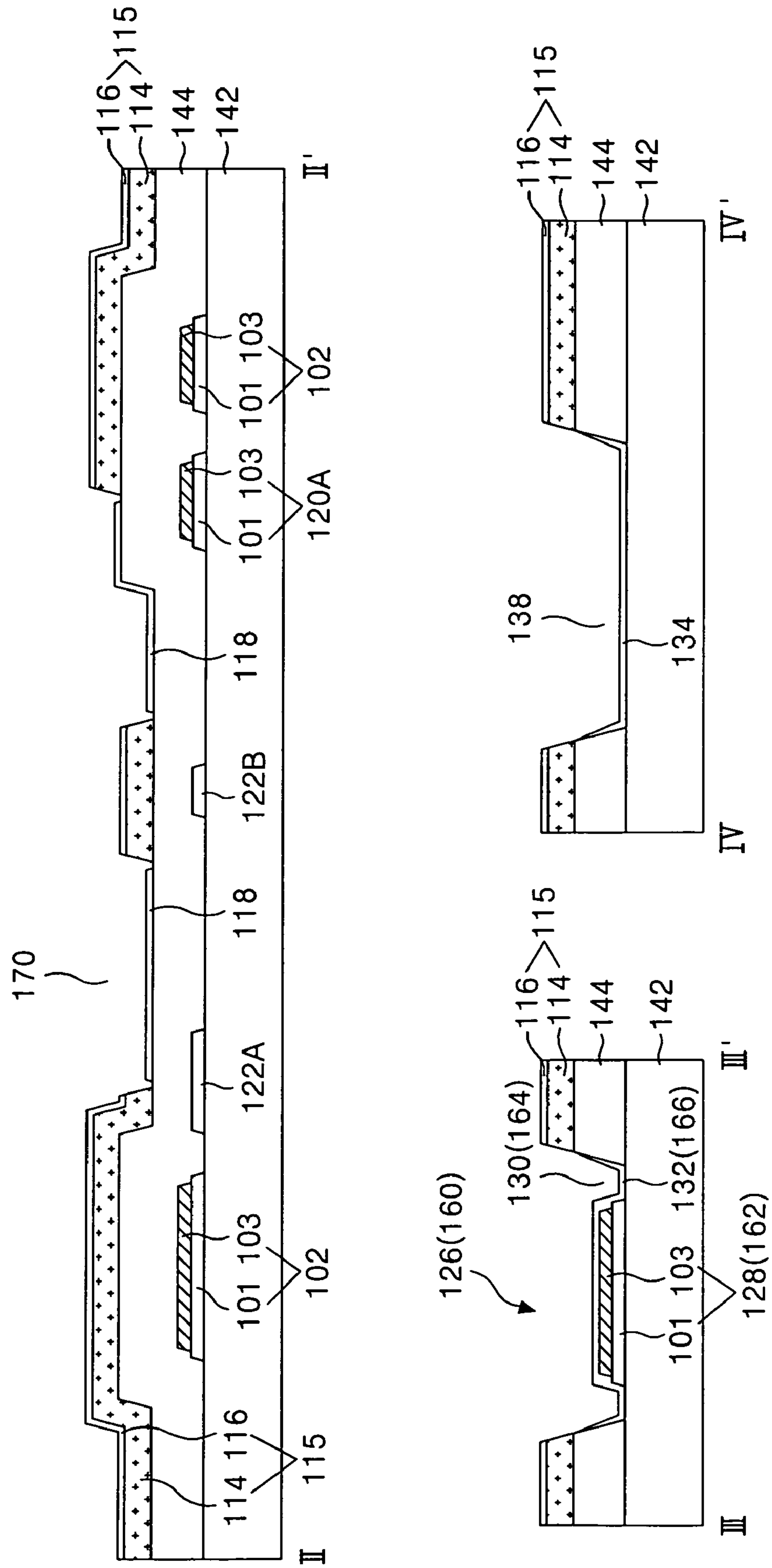

Referring to FIG. 8D, the photo-resist pattern 200A coated with the transparent conductive film 117 shown in FIG. 8C is removed by the lift-off process.

Figure 9A:
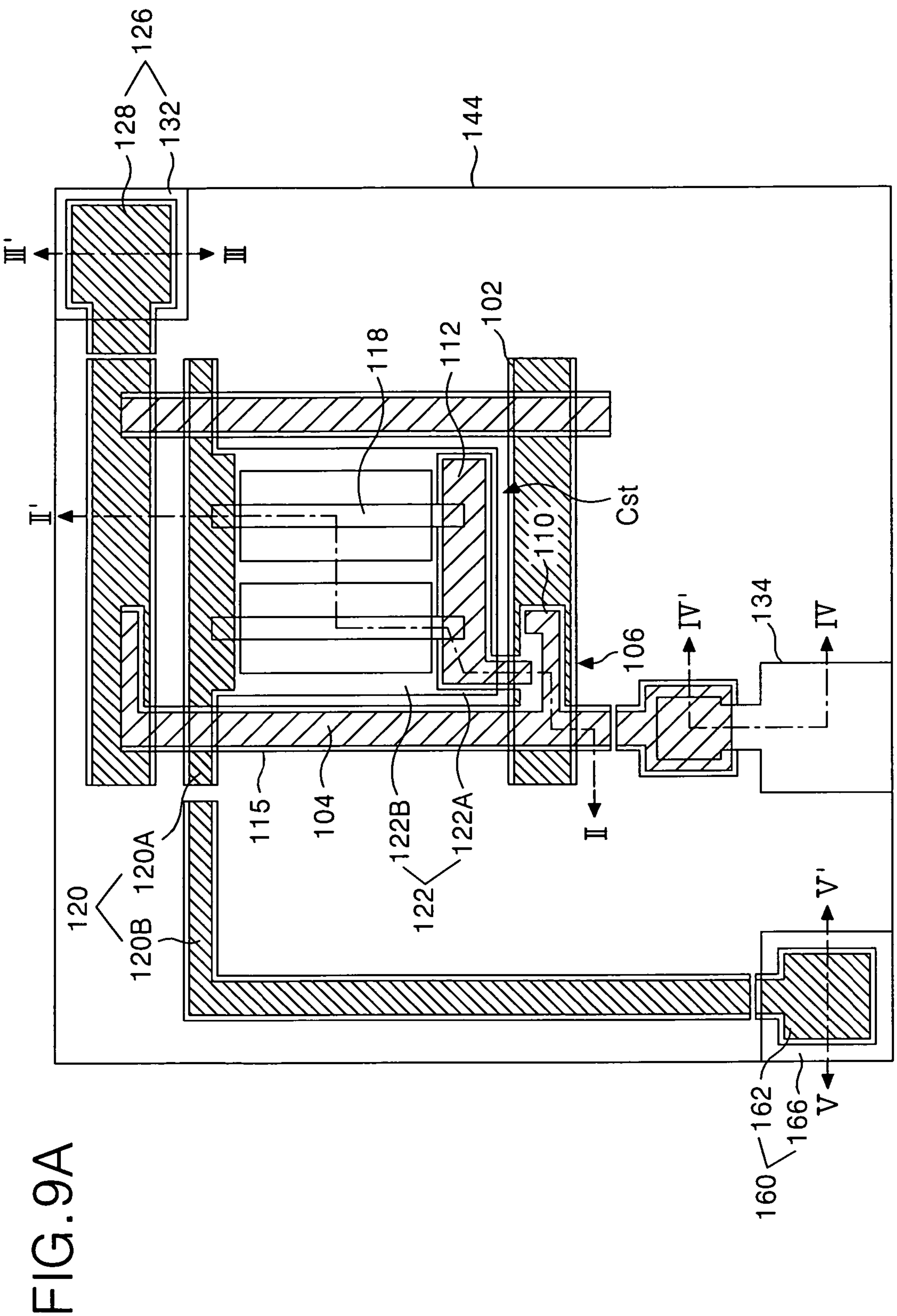
FIG. 9A and FIG. 9B are a plan view and a section view for showing a third mask process in a method of fabricating the thin film transistor substrate of horizontal electric field applying type according to the embodiment of the present invention.
Figure 9B:
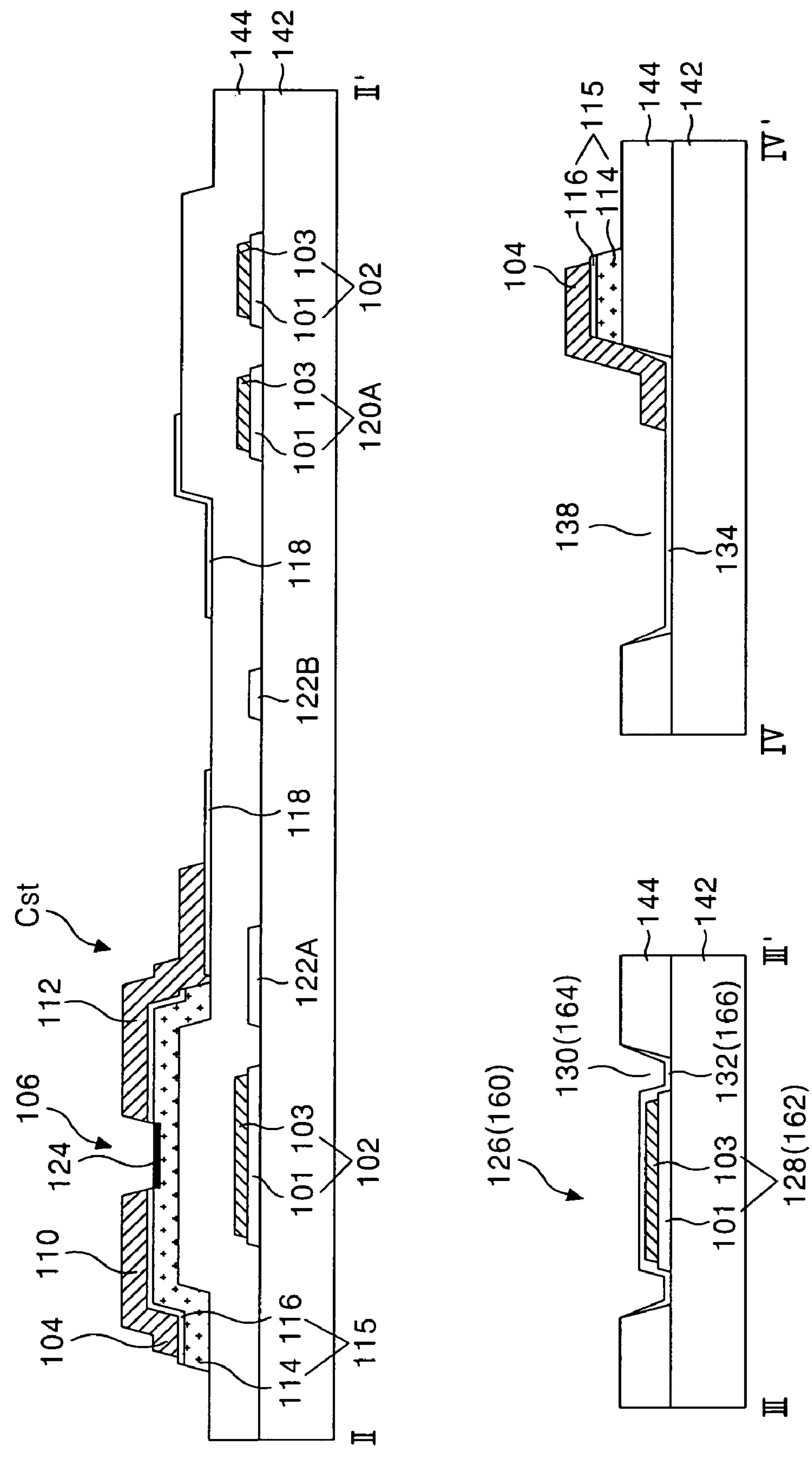

FIG. 9A and FIG. 9B are a plan view and a section view, respectively, showing a third mask process in a method of fabricating the thin film transistor substrate of horizontal electric field LCD according to the present invention and FIG. 10A to FIG. 10D are section views for specifically explaining the third mask process.

A source/drain metal pattern including the data line 104, the source electrode 110, and the drain electrode 112 is on the lower substrate 142 with the semiconductor layer 115 and the transparent conductive pattern by the third mask process. Further, the semiconductor layer 115 not overlapping with the source/drain metal pattern is removed and the active layer 114 between the source electrode 110 and the drain electrode 112 is exposed, thereby defining a channel of the thin film transistor 106. The source/drain metal pattern and the channel of the thin film transistor 106 are formed by a single mask process using a partial transmitting mask such as a diffractive exposure mask or a half tone mask, etc.

Figure 10A:
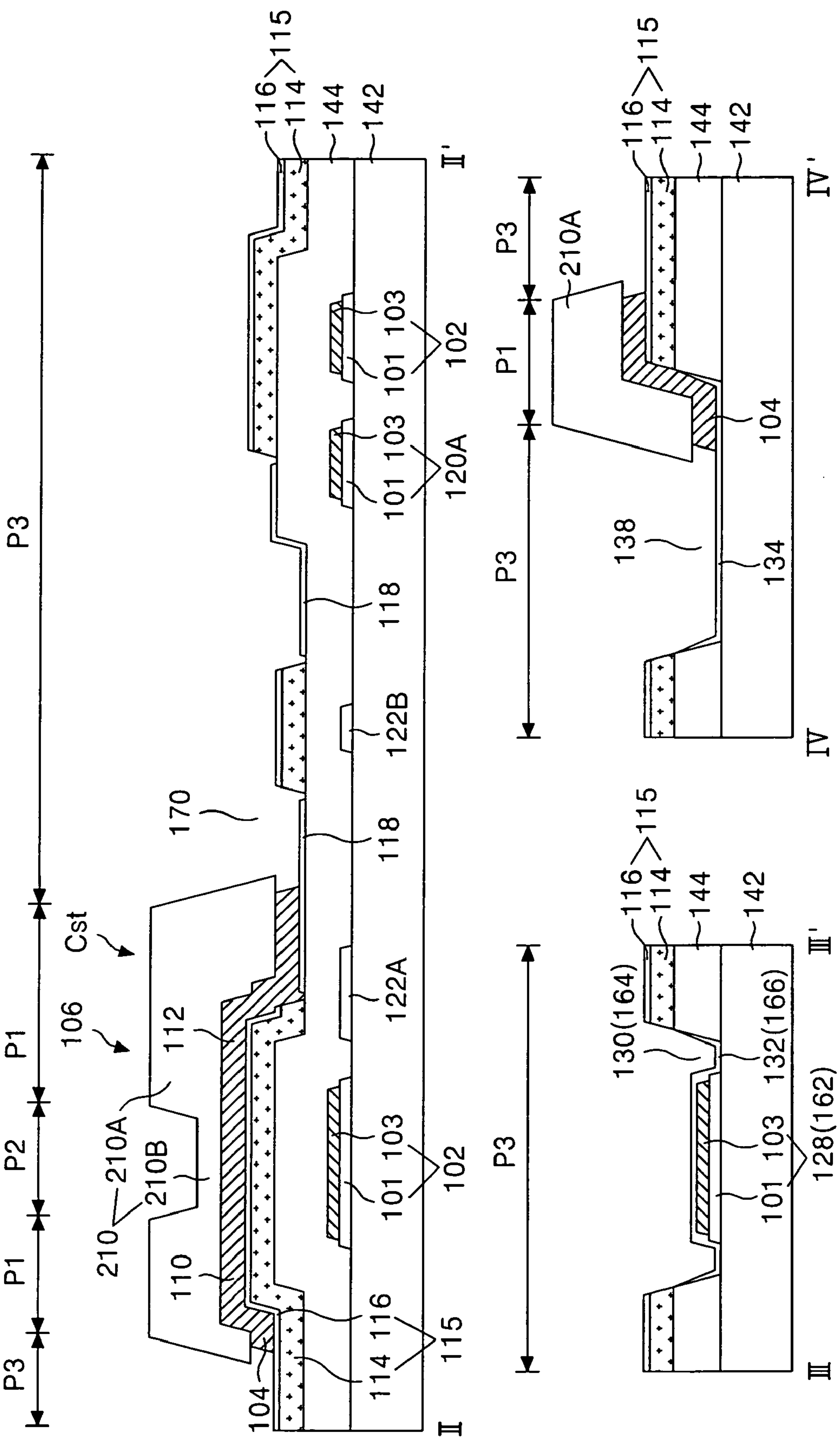
FIG. 10A to FIG. 10D are section views for showing the third mask process.

Referring to FIG. 10A, a source/drain metal layer is formed on the lower substrate 142 provided with the semiconductor layer 115 and the transparent conductive pattern by a deposition technique such as the sputtering, etc. The source/drain metal layer employs a single layer made from a metal material such as Mo, Ti, Cu, AlNd, Al, Cr, a Mo alloy, a Cu alloy or an Al alloy, etc., or has a layered structure with at least two layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo alloy, Mo-alloy/Al, Al-alloy/Mo-alloy, Mo-alloy/Al-alloy, Mo/Al alloy, Cu/Mo alloy or Cu/Mo(Ti), etc.

Subsequently, a third photo-resist pattern 210 including photo-resist patterns 210A and 210B having different thicknesses formed on the source/drain metal layer by photolithography using the partial transmitting mask. The partial transmitting mask is comprised of a shielding part that shields ultraviolet rays, a partial transmitting part that diffracts the ultraviolet rays using a slit pattern or partially transmitting the ultraviolet rays using a phase-shifting material, and a full transmitting part that fully transmits the ultraviolet rays. The third photo-resist pattern 210 including different thicknesses of photo-resist patterns 210A and 210B and an aperture part is formed by photolithography using the partial transmitting mask. In this case, a relatively thick photo-resist pattern 210A is formed at a shielding area P1 overlapping with the shielding part of the partial transmitting mask; the photo-resist pattern 210B that is thinner than the photo-resist pattern 210A is formed at a partial exposure area P2 overlapping with the partial transmitting part, that is, an area to be provided with the channel; and the aperture part is provided at a full exposure area P3 overlapping with the full transmitting part.

Further, the source/drain metal layer is patterned by the etching process using the third photo-resist pattern 210 to thereby provide the source/drain metal pattern including the data line 104 and the drain electrode 112 being integral to the source electrode 110. For instance, the source/drain metal layer is patterned by a wet etching process, so that the source/drain metal pattern has an over-etched structure in comparison to the third photo-resist pattern 210. The drain electrode 112 of the source/drain metal pattern overlaps with a portion of the pixel electrode 118 that overlaps with the horizontal part 122A of the common electrode 122 to be connected to the pixel electrode 118. The data line 104 overlaps with the data pad 134 provided within the third contact hole 138 to be connected to the data pad 134.

Figure 10B:
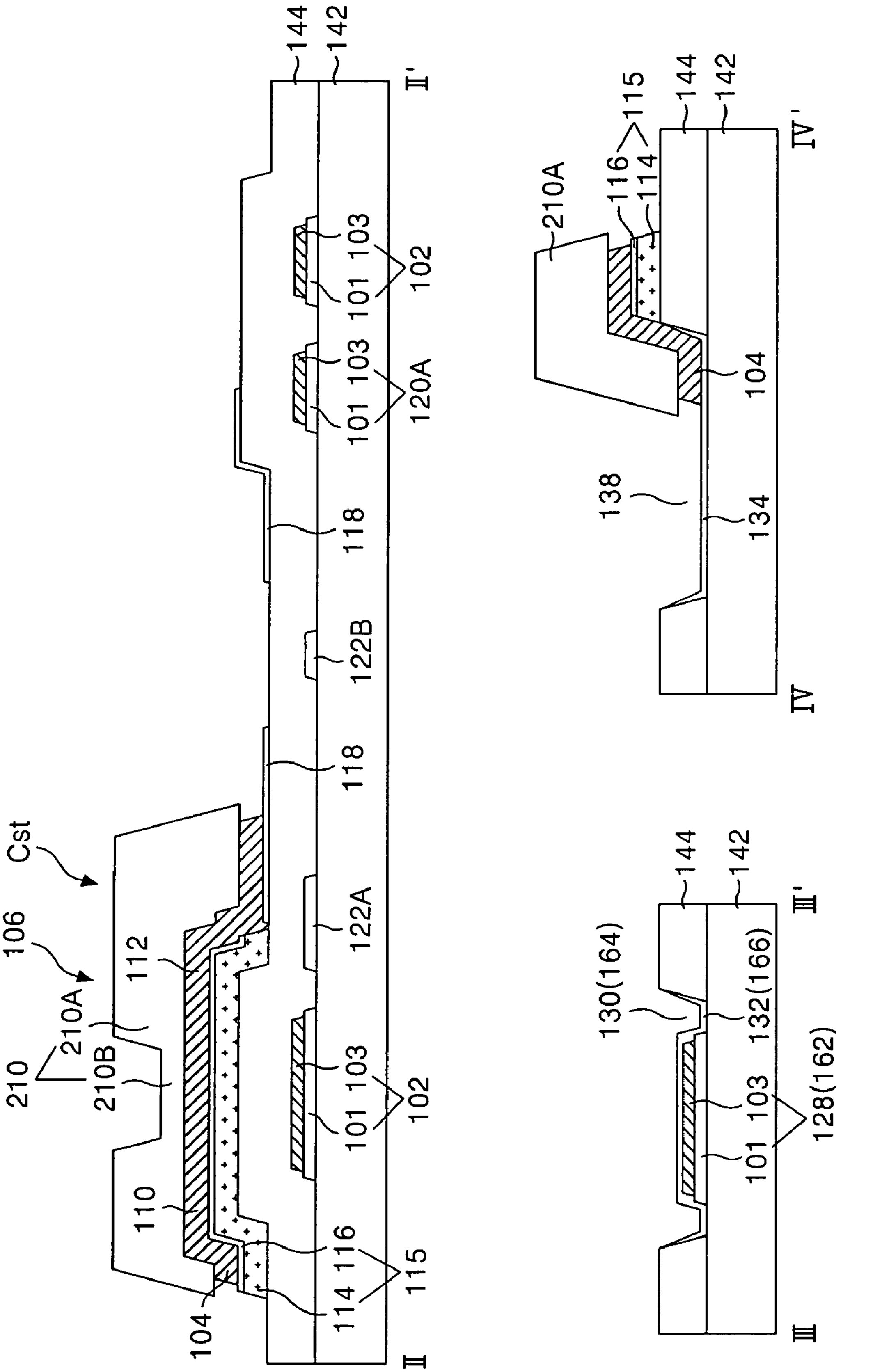

Referring to FIG. 10B, the semiconductor layer 115 exposed through the third photo-resist pattern 210 is etched, so that the semiconductor layer 115 exists only in the area where it overlaps the second photo-resist pattern 210. For instance, the exposed semiconductor layer 115 is etched by the dry etching process by using the third photo-resist pattern 210 as a mask. Thus, the semiconductor layer 115 exists where it overlaps the third photo-resist pattern 210 used to form the source/drain metal pattern to thereby overlap with the source/drain metal pattern, and has a structure in which the edge of the semiconductor layer 115 protrudes further than that of the source/drain metal pattern. As a result, the source/drain metal pattern and the semiconductor layer 115 have a step shape.

Figure 10C:
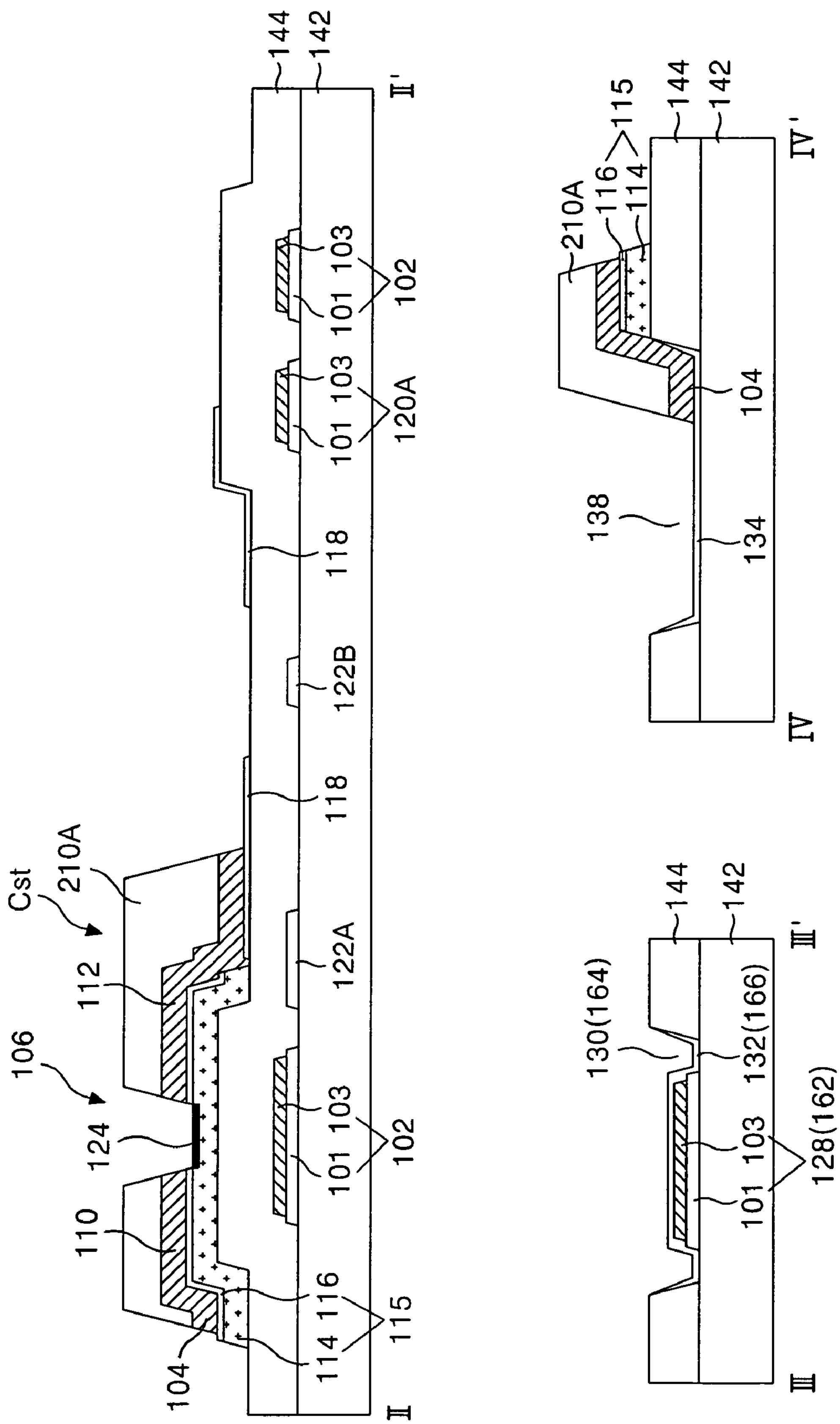

Referring to FIG. 10C, the thickness of the photo-resist pattern 210A is reduced and the photo-resist pattern 210B shown in FIG. 10B is removed by the ashing process using an oxygen ($O_2$) plasma. Such an ashing process may be incorporated with the dry etching process for etching the exposed semiconductor layer 115 to be performed within the same chamber. Further, the exposed source/drain metal pattern and the ohmic contact layer 116 are removed by the etching process using the ashed photo-resist pattern 210A. Thus, the source electrode 110 and the drain electrode 112 are separated from each other, and the thin film transistor 106 having the channel exposing the active layer 114 between them is completed.

Furthermore, the surface of the active layer 114 exposed by the surface treatment process using an oxygen ($O_2$) plasma is oxidized by $SiO_2$. Thus, the active layer 114 defining the channel of the thin film transistor 106 may be protected by the surface layer 124 oxidized by $SiO_2$.

Figure 10D:
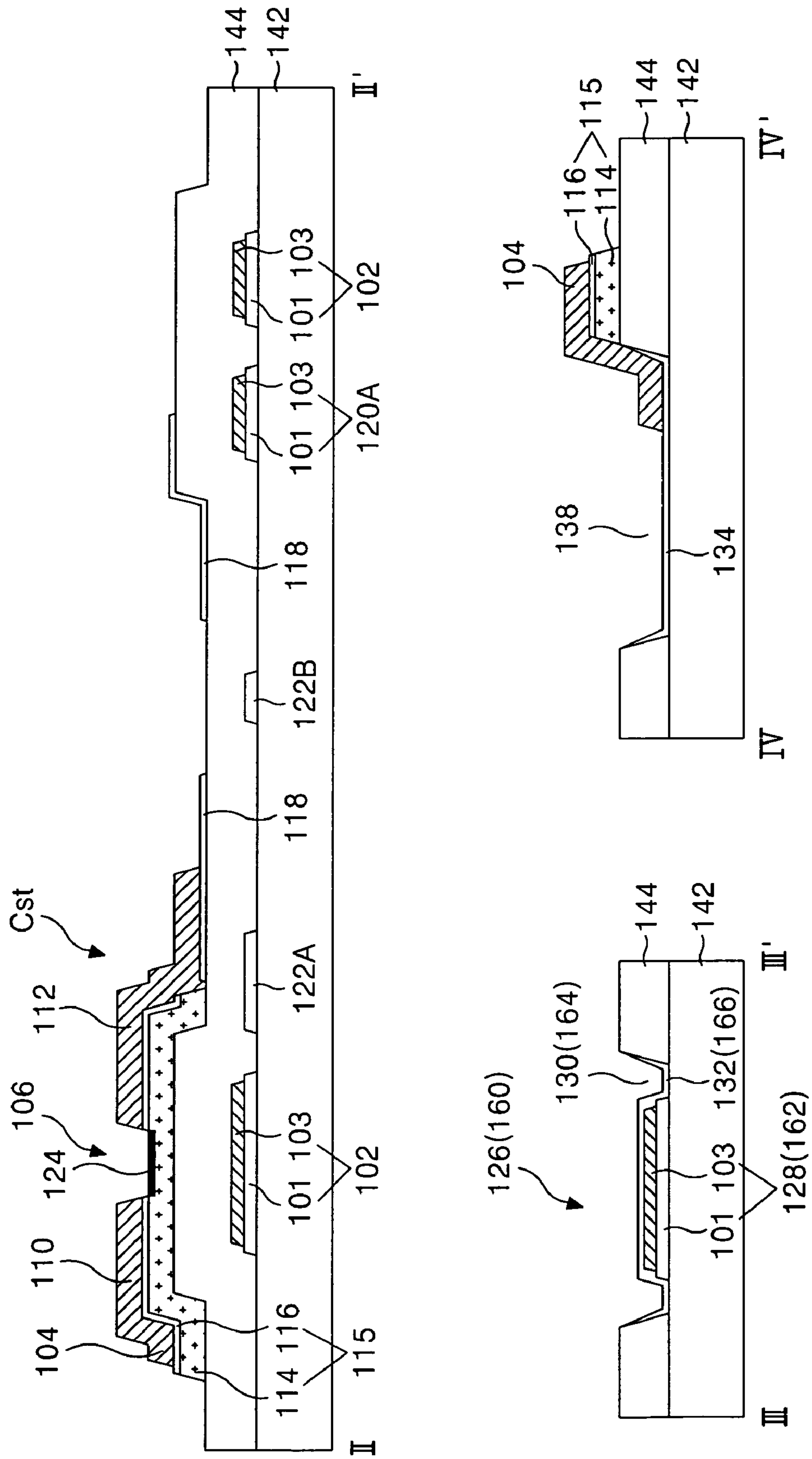

Referring to FIG. 10D, the photo-resist pattern 210A shown in FIG. 10C is removed by the stripping process.

As described above, the method of fabricating the thin film transistor substrate of a horizontal electric field LCD according to the first embodiment of the present invention may reduce the number of processes using the three-round mask process.

Figure 11:
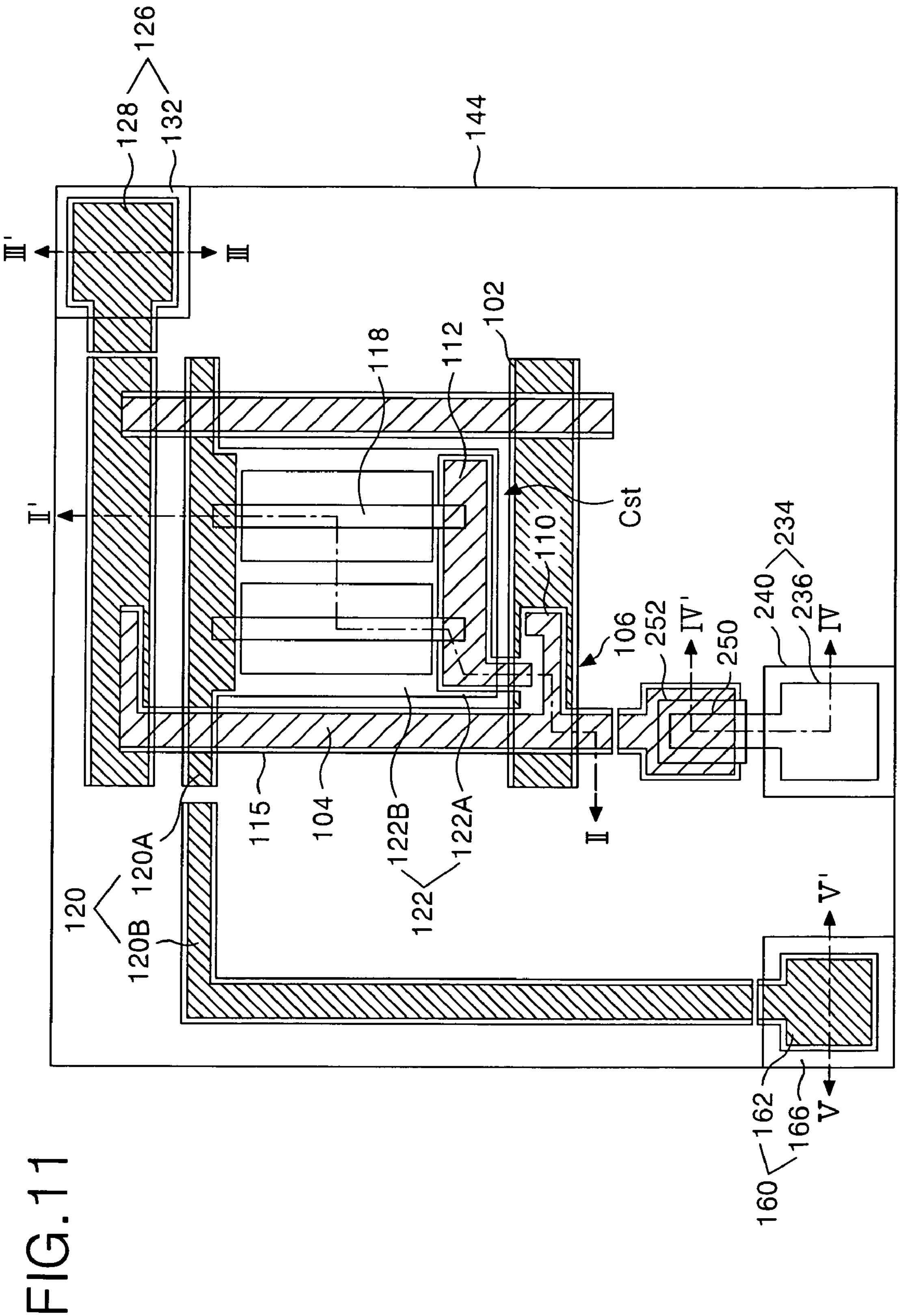
FIG. 11 is a plan view showing a portion of a thin film transistor substrate according to a second embodiment of the present invention.
Figure 12:
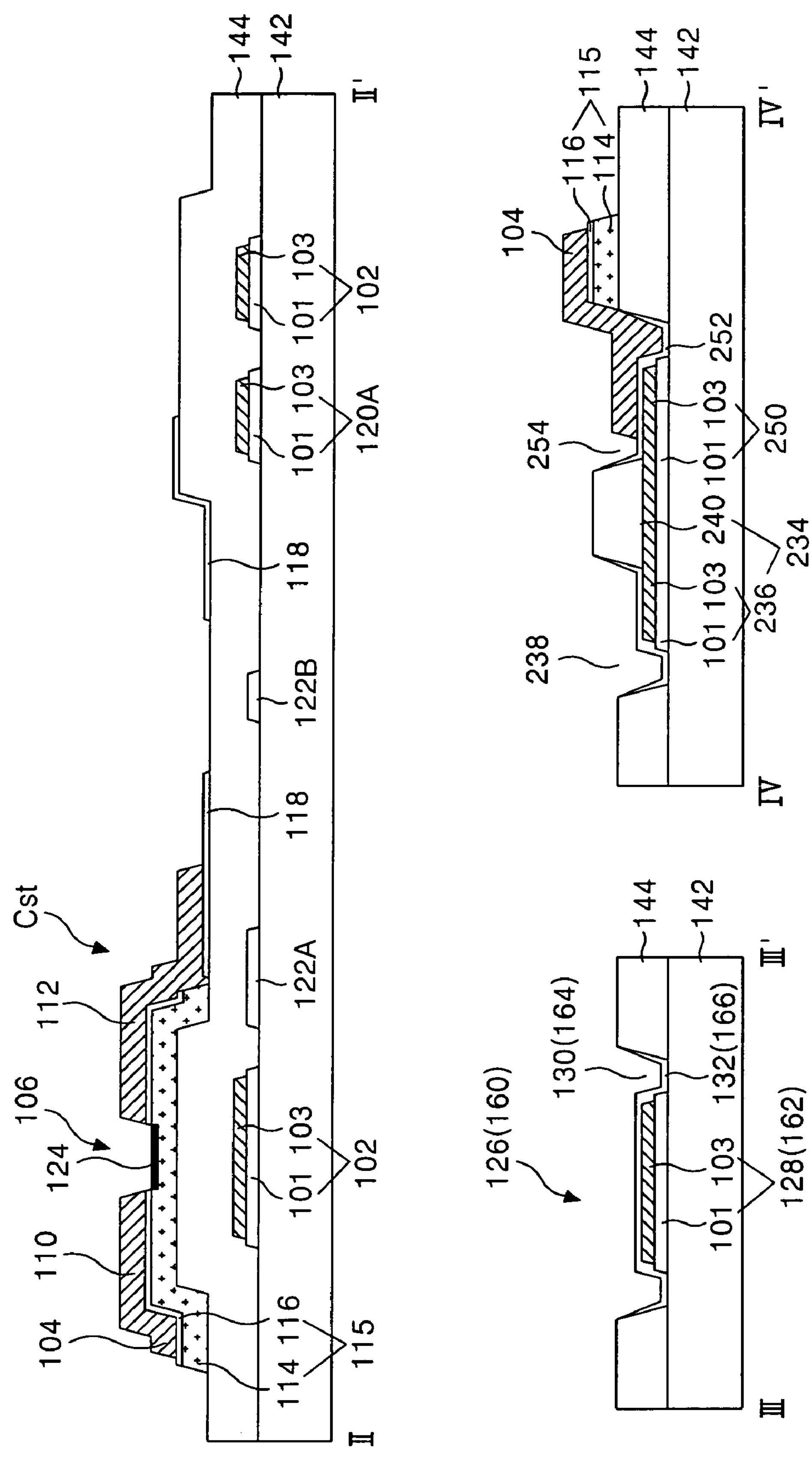
FIG. 12 is a section view of the thin film transistor substrate taken along the II-II', III-III' and IV-IV' lines in FIG. 11.

FIG. 11 is a plan view showing a portion of a thin film transistor substrate according to a second embodiment of the present invention, and FIG. 12 is a section view of the thin film transistor substrate taken along the lines II-II', III-III' and IV-IV' in FIG. 11.

The thin film transistor substrate shown in FIG. 11 and FIG. 12 has the same elements as the thin film transistor substrate shown in FIG. 2 and FIG. 3A except that a data pad 234 has a vertical structure identical to the gate pad 126; and it further includes a contact electrode 252 for connecting a data link 250 extending from the data pad 234 to the data line 104. Therefore, an explanation as to the same elements will be omitted.

Referring to FIG. 11 and FIG. 12, the data pad 234 includes a lower data pad electrode 236 formed on the substrate 142, and an upper data pad electrode 240 provided within a third contact hole 238 passing through the gate insulating film 144 to expose the lower data pad electrode 236 to be connected to the lower data pad electrode 236 similar to the gate pad 126.

The data link 250 extends from the lower electrode 236 of the data pad 234 in such a manner to overlap with the data line 104 and is exposed through a fourth contact hole 254 passing through the gate insulating film 144. The data link 250 is connected, via the contact electrode 252 provided within the fourth contact hole 254, to the data line 104.

The lower data pad electrode 236 and the data link 250, along with the lower gate pad electrode 128, are formed by the first mask process. The third and fourth contact holes 238 and 254, along with the first contact hole 130, are formed by the second mask process. In the second mask process, the upper data pad electrode 240 and the contact electrode 252, along with the upper gate pad electrode 132, are formed within the third and fourth contact holes 238 and 254, respectively. The upper data pad electrode 240 and the contact electrode 252 border with the edge of the gate insulating film 144 enclosing the third and fourth contact holes 238 and 254.

Further, the data line 104 is positioned within an area sealed by the sealant, so that it may be protected by the alignment film coated thereon or the liquid crystal in the sealed area. To this end, the contact electrode 252 for connecting the data line 104 to the data link 250 is located within the sealed area.

Figure 13:
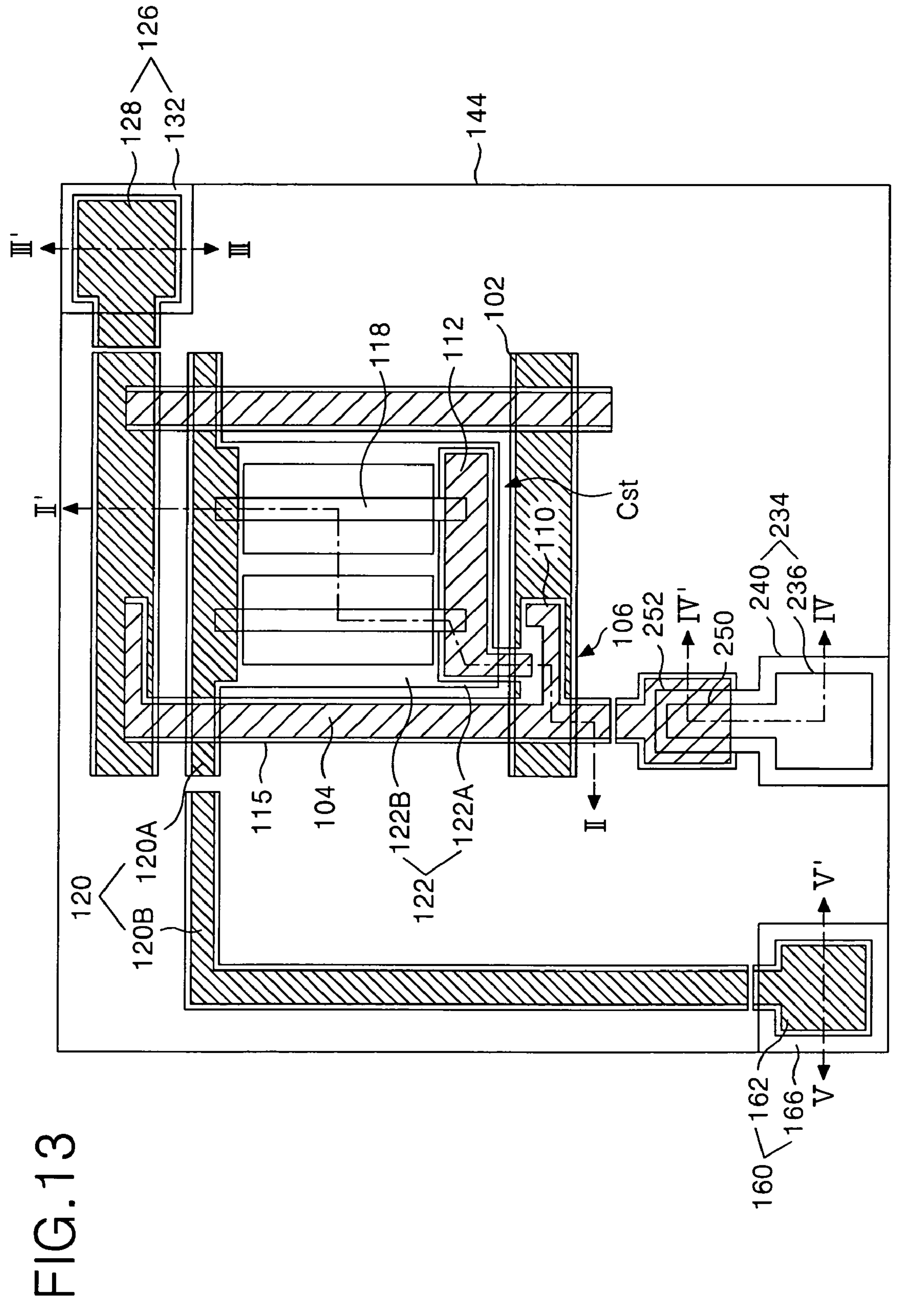
FIG. 13 is a plan view showing a portion of a thin film transistor substrate according to a third embodiment of the present invention.
Figure 14:
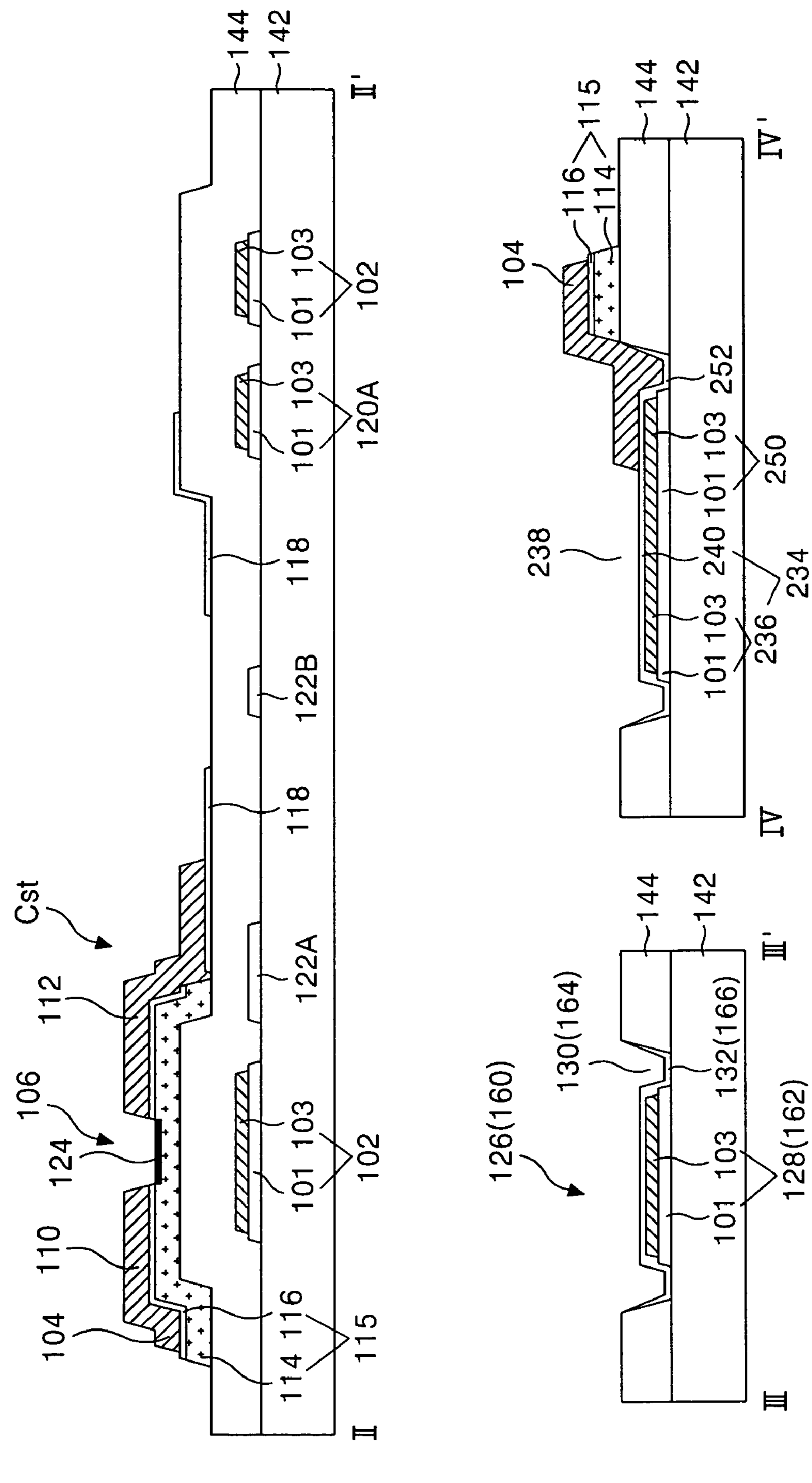
FIG. 14 is a section view of the thin film transistor substrate taken along the II-II', III-III' and IV-IV' lines in FIG. 13.

FIG. 13 is a plan view showing a portion of a thin film transistor substrate according to a third embodiment of the present invention, and FIG. 14 is a section view of the thin film transistor substrate taken along the lines II-II', III-III' and IV-IV' in FIG. 13.

The thin film transistor substrate shown in FIG. 13 and FIG. 14 has the same elements as the thin film transistor substrate shown in FIG. 11 and FIG. 12 except that the upper data pad electrode 240 is integral to the contact electrode 252 within the third contact hole 238 extending along the data link 250. Therefore, an explanation as to the same elements will be omitted.

Referring to FIG. 13 and FIG. 14, the third contact hole 238 of the data pad 234 extends along the data link 250 so as to overlap the data line 104. Thus, the upper data pad electrode 240 and the contact electrode 252 are formed in an integral structure within the second contact hole 238 to be connected to the data line 104. The upper data pad electrode 240 and the contact electrode 252 border with the edge of the gate insulating film 144 enclosing the third contact hole 238.

Figure 15:
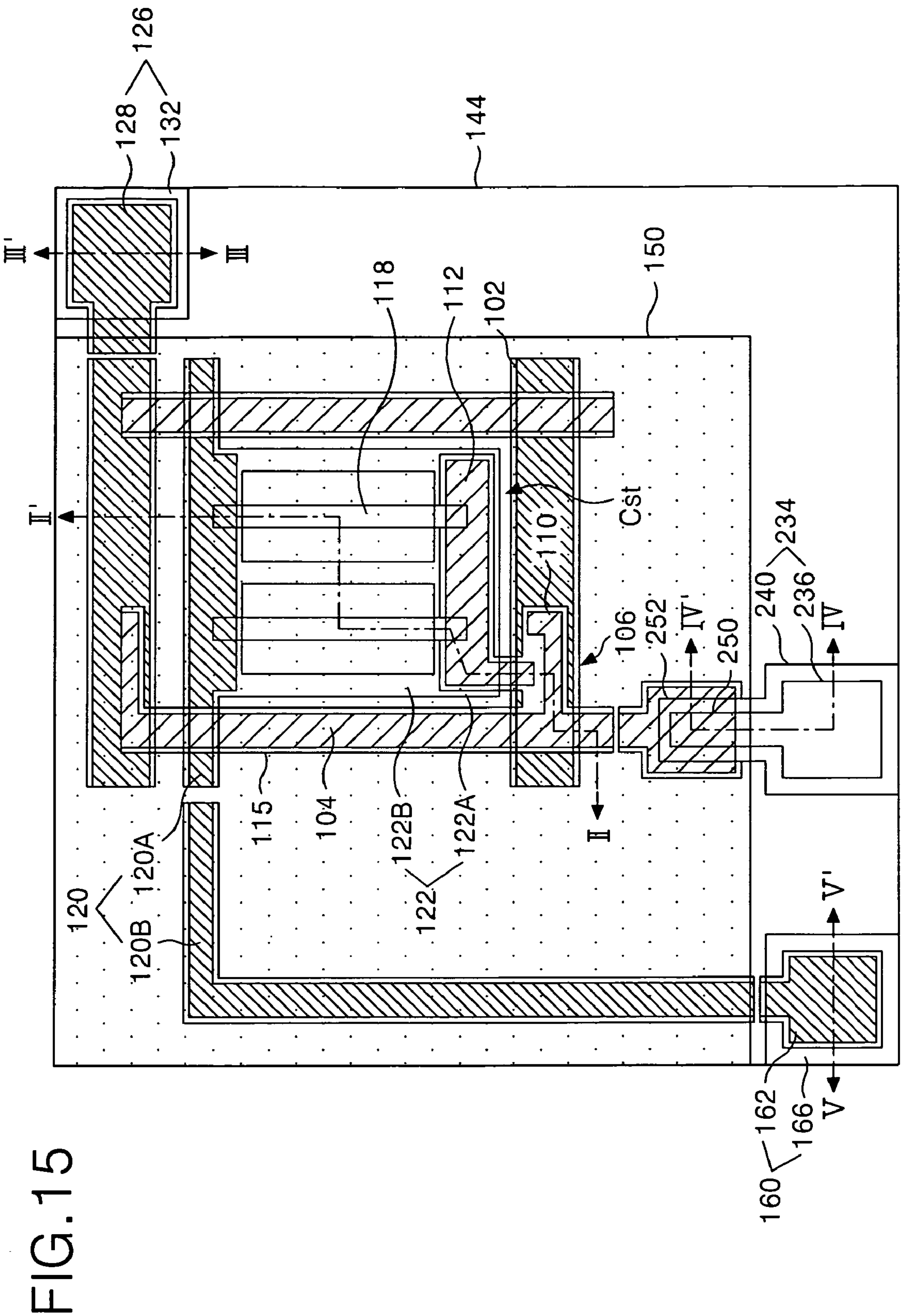
FIG. 15 is a plan view showing a portion of a thin film transistor substrate according to a fourth embodiment of the present invention.
Figure 16:
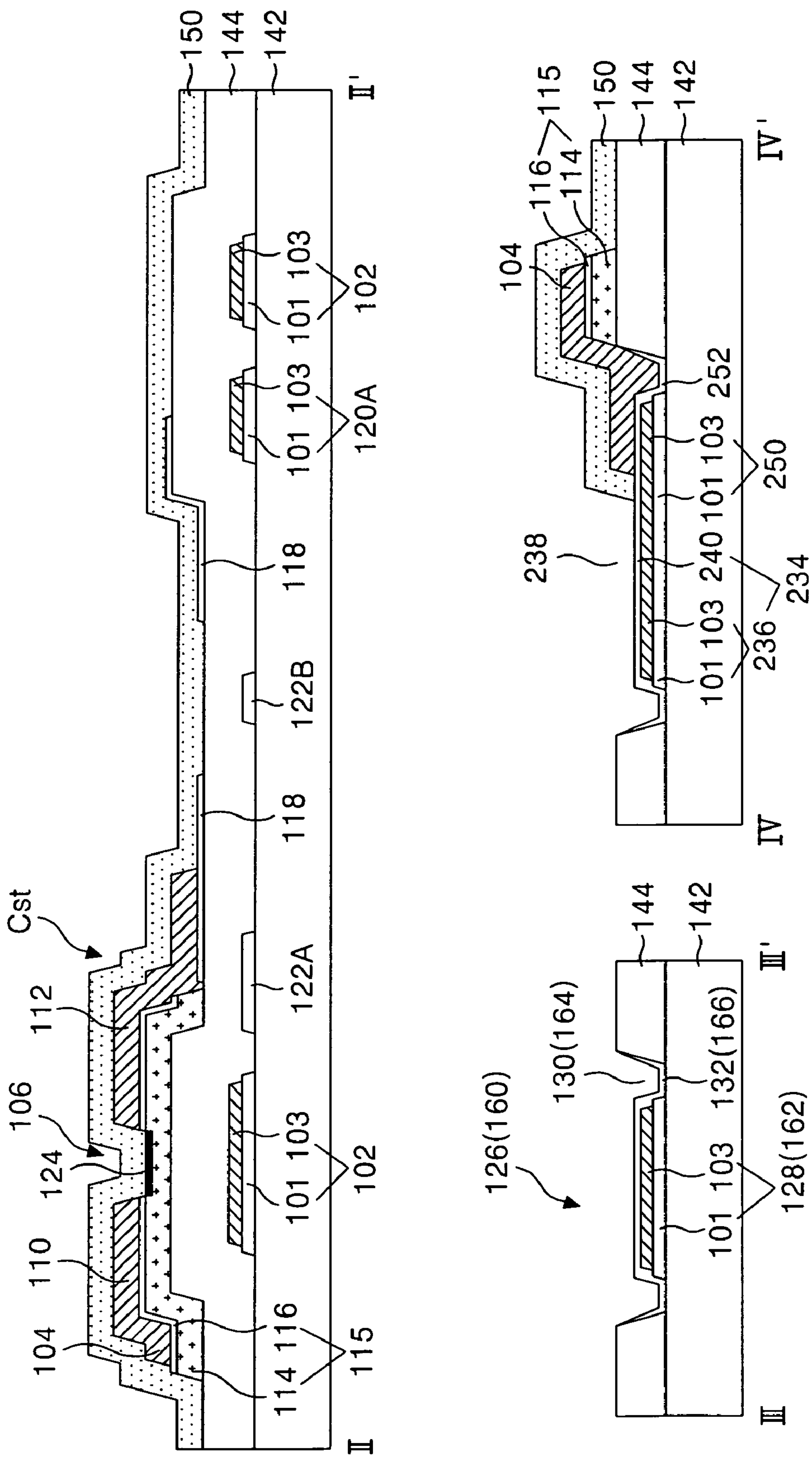
FIG. 16 is a section view of the thin film transistor substrate taken along the II-II', III-III' and IV-IV' lines in FIG. 15.

FIG. 15 is a plan view showing a portion of a thin film transistor substrate according to a fourth embodiment of the present invention, and FIG. 16 is a section view of the thin film transistor substrate taken along the lines II-II', III-III' and IV-IV' in FIG. 15.

The thin film transistor substrate shown in FIG. 15 and FIG. 16 has the same elements as the thin film transistor substrate shown in FIG. 13 and FIG. 14 except that it further includes a protective film 150 formed on the array area except the pad area where the gate pad 126 and a data pad 234 are positioned. Therefore, an explanation as to the same elements will be omitted.

Referring to FIG. 15 and FIG. 16, the protective film 150 is formed on the substrate 142 provided with the source/drain metal pattern so as to be removed at the pad area where the gate pad 126 and the data pad 134 are formed. The protective film 150 is formed from an inorganic insulating film like the gate insulating film 144. Alternatively, the protective film 150 may be formed an acrylic organic compound, BCB (benzocyclobutene) PFCB (perfluorocyclobutane), etc.

The protective film 150 is formed by the fourth mask process or by a rubber stamp printing system like the alignment film to be formed into the uppermost layer. Further, the protective film 150 is entirely formed on the substrate 142 and then is removed at the pad area by the etching process using the alignment film as a mask or by the etching process using the color filter substrate as a mask after joining the substrate 142 to the color filter substrate.

First, when the fourth mask process is used, the protective film 150 is entirely formed on the substrate 142 provided with the source/drain metal pattern. The protective film 150 may be formed by PECVD, spin coating, spinless coating, etc. Further, the protective film 150 is patterned by photolithography and the etching process using a fourth mask to open the protective film 150 at the pad area.

Second, the protective film 150 may be printed only on array area except the pad area using a rubber stamp printing technique that is also the method of forming the alignment film to be provided thereon. In other words, the protective film 150 is formed by aligning a rubber mask on the substrate 142 provided with the source/drain metal pattern and then printing an insulating material only on an array area except the pad area using the rubber stamp printing technique.

Figure 17A:
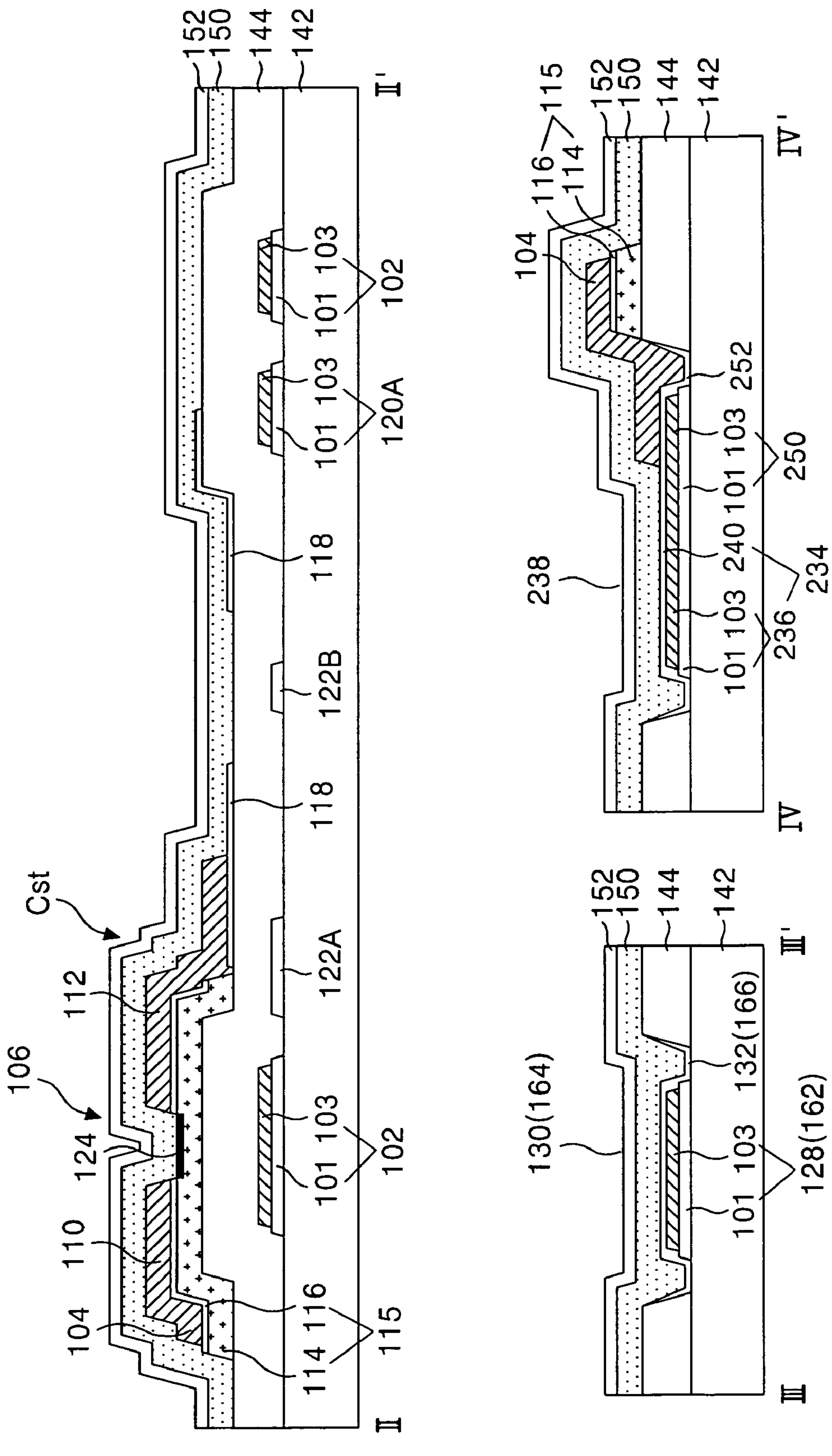
FIG. 17A and FIG. 17B are section views for explaining a method of fabricating a protective film according to another embodiment of the present invention.
Figure 17B:
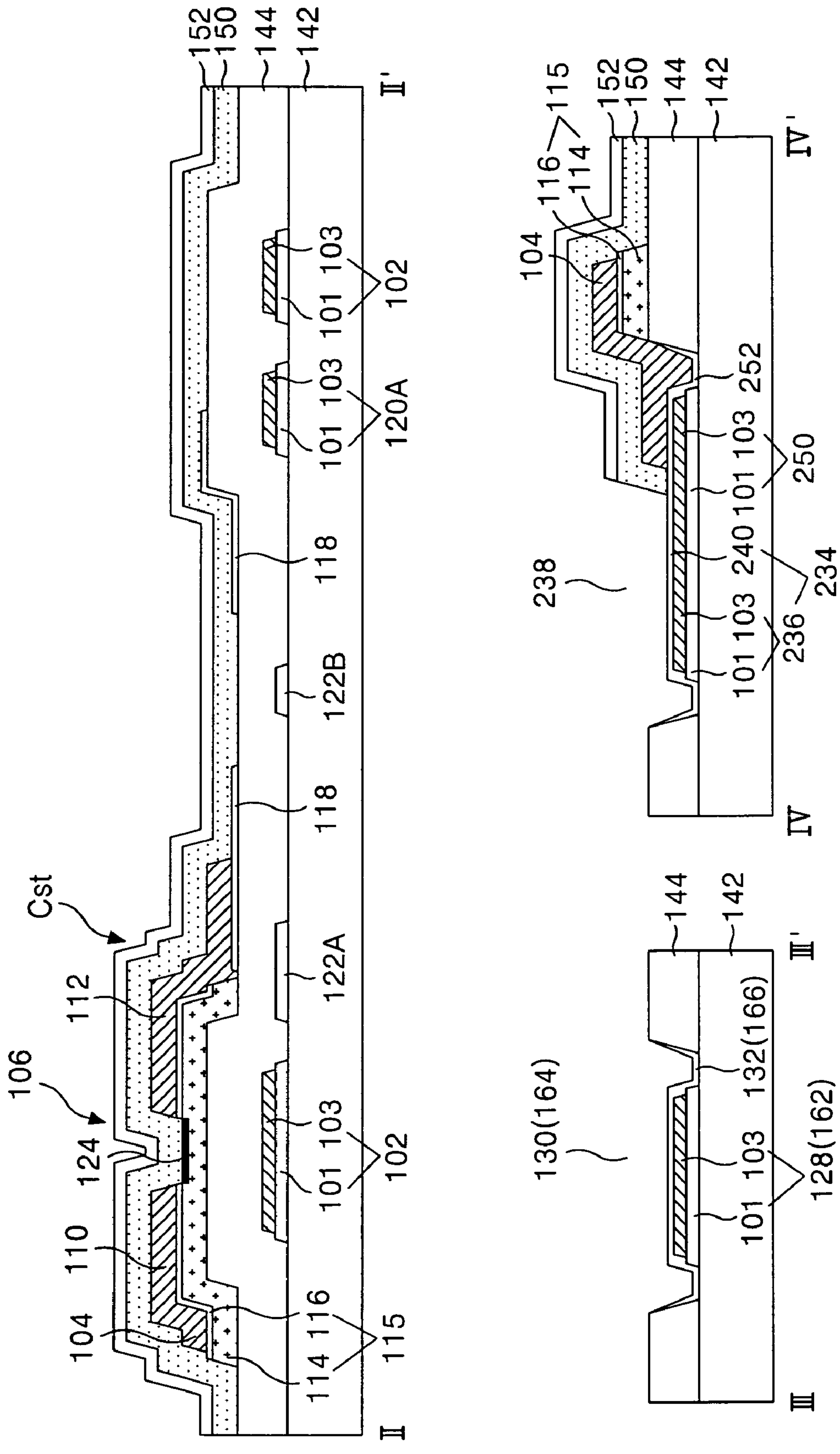

Third, the protective film 150 may be removed at the pad area by an etching process using the alignment film provided thereon. More specifically, as shown in FIG. 17A, the protective film 150 is entirely formed on the substrate 142, and the alignment film 152 is formed on the protective film 150 using a rubber stamp printing method. Subsequently, as shown in FIG. 17B, the protective film 150 is removed at the pad area by an etching process using the alignment film 152 as a mask.

Figure 18A:
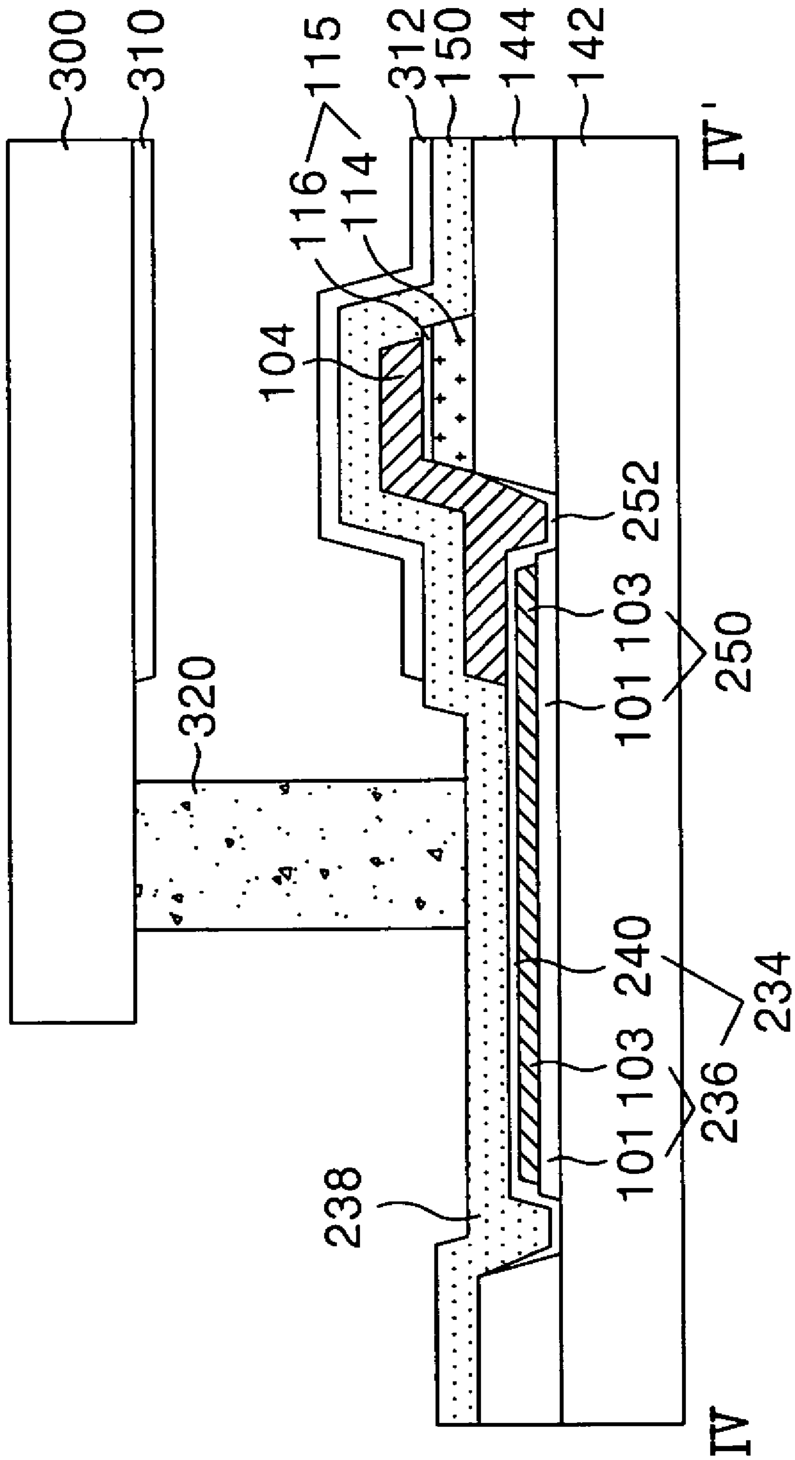
FIG. 18A and FIG. 18B are section views for explaining a fabricating method of the protective film in a method of fabricating the liquid crystal display panel employing the thin film transistor substrate according to the embodiment of the present invention.
Figure 18B:
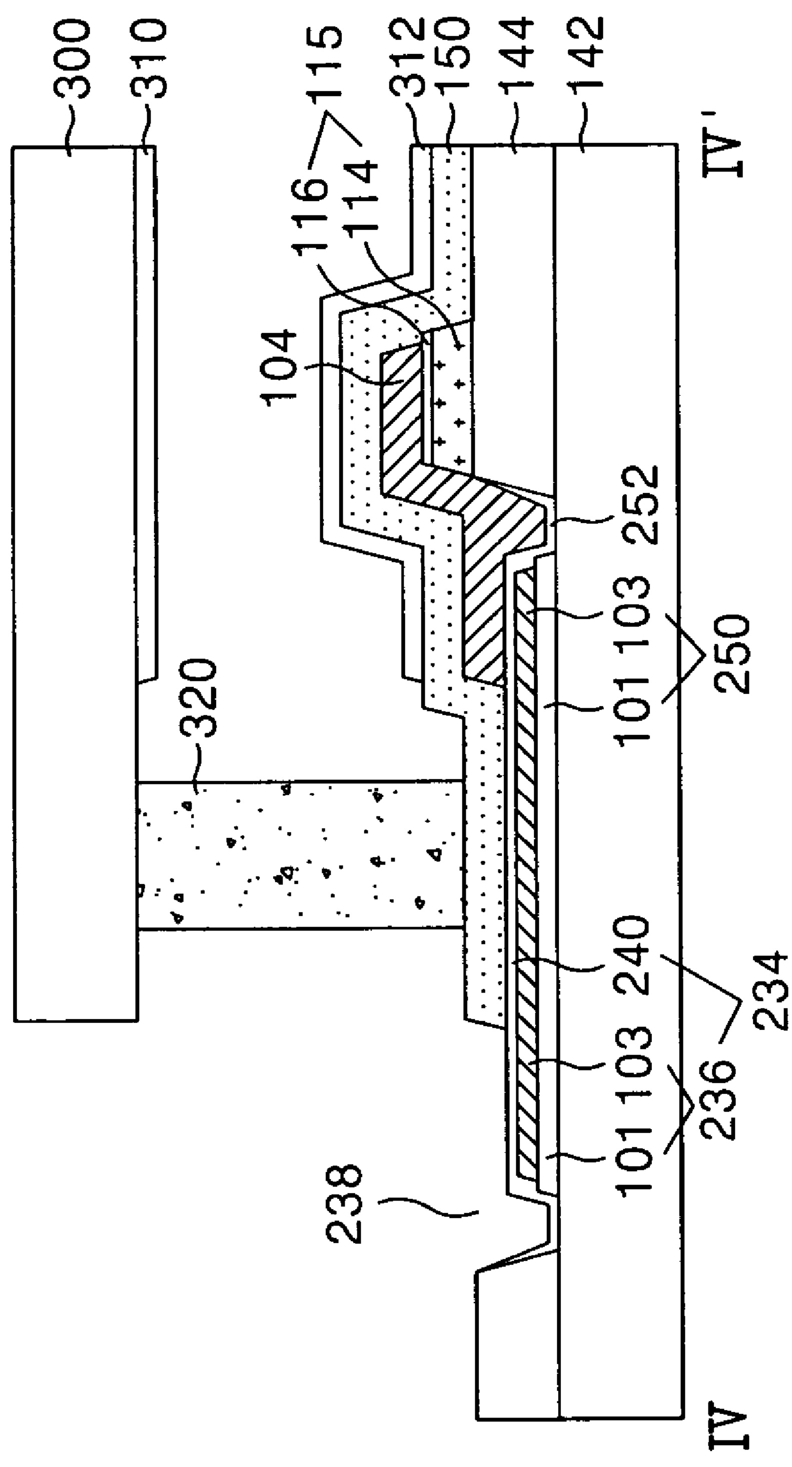

Fourth, the protective film 150 may be removed at the pad area by an etching process using the color filter substrate as a mask. More specifically, as shown in FIG. 18A, the thin film transistor substrate provided with the protective film 150 and having the lower alignment film 312 provided on thereon is joined to the color filter substrate 300 provided with the upper alignment film 310 by a sealant 320. Next, as shown in FIG. 18B, the protective film 150 is removed at the pad area by an etching process using the color filter substrate 300 as a mask. In this case, the protective film 150 is removed at the pad area by an etching process using plasma or is removed at the pad area by dipping the liquid crystal display panel in which the thin film transistor substrate is joined to the color filter substrate 300 into an etching vessel filled with an echant liquid.

As described above, according to the present invention, a single-layer structure of the common electrode is formed, along with a multiple-layer structure of other items of the first mask pattern group with the aid of the first partial transmitting mask.

Furthermore, according to the present invention, the semiconductor layer and the gate insulating film are simultaneously patterned by a single mask process using the second partial transmitting mask to provide a plurality of holes having different depths and to provide the transparent conductive pattern within the plurality of holes by using a lift-off process to remove the photo-resist pattern used in the mask process.

Moreover, according to the present invention, the semiconductor layer patterned simultaneously with the gate insulating film is again patterned upon formation of the source/drain metal pattern to remove the exposed portion thereof; and the active layer between the source electrode and the drain electrode is exposed to define the channel of the thin film transistor by utilizing the third partial transmitting mask. Thus, the semiconductor layer exists in the channel of the thin film transistor and the area overlapping the source/drain metal pattern and the gate insulating film.

In addition, according to the present invention, the protective film opening in the pad area is further provided by a printing technique, the fourth mask process, the etching process using the alignment film as a mask, or the etching process using the color filter substrate as a mask, etc.

Accordingly, the method of fabricating the thin film transistor according to the present invention may be simplified by the three-step mask process or the four-step mask process, so that the material and cost is reduced and equipment as well as to improve the productivity.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising: first and second substrates; a gate line on the first substrate; a data line crossing the gate line defining a pixel area with a gate insulating film therebetween; a thin film transistor including a gate electrode, a source electrode, a drain electrode, and a semiconductor layer with a channel between the source electrode and the drain electrode; a common line in parallel to the gate line on the first substrate; a common electrode extending from the common line into the pixel area; a pixel electrode on the gate insulating film in the pixel area; and a storage capacitor where the drain electrode overlaps a portion of the common electrode, wherein the drain electrode overlaps with the pixel electrode to connect to the pixel electrode; wherein the semiconductor layer is removed from an area where it overlaps a transparent conductive film, and the common electrode includes a horizontal part overlapped with the drain electrode and a plurality of finger parts extending from the horizontal part and connected to the common line, wherein the pixel electrode connects to the drain electrode where the drain electrode overlaps the common electrode.

2. The device as claimed in claim 1, wherein the gate line and the common line have at least two conductive layers and the common electrode is formed by an extension of a transparent conductive layer of the common line.

3. The device as claimed in claim 2, wherein the at least two conductive layers has the transparent conductive layer.

4. The device as claimed in claim 1, wherein the pixel electrode overlaps with the common line.

5. The device as claimed in claim 1, wherein the gate line and the common line are formed of a metal layer.

6. The device as claimed in claim 1, wherein the storage capacitor further includes a semiconductor layer at the overlapping portion between the drain electrode and the gate insulating film.

7. The device as claimed in claim 1, further comprising:

a pad connected to at least one of the gate line, the common line, and the data line, wherein the pad includes:

a lower pad electrode on the first substrate; and an upper pad electrode in a contact hole passing through the gate insulating film to expose the lower pad electrode and connected to the lower pad electrode.

8. The device as claimed in claim 7, wherein the lower pad electrode is connected to at least one of the gate line and the common line.

9. The device as claimed in claim 7, further comprising:

a data link extending from the lower pad electrode so as to overlap the data line; and a contact electrode in a second contact hole passing through the gate insulating film to expose the data link, thereby connecting the data link to the data line.

10. The device as claimed in claim 9, wherein the contact hole with the upper pad electrode extends along the data link to be integral with the second contact hole, and the upper pad electrode is integral with the contact electrode.

11. The device as claimed in claim 9, wherein the upper pad electrode and the contact electrode are formed of a transparent conductive layer bordering with the gate insulating film and enclosing the corresponding hole.

12. The device as claimed in claim 9, wherein a contact portion between the data line and the contact electrode is within an area to be sealed by a sealant upon joining of the first substrate with the second substrate.

13. The device as claimed in claim 10, wherein a contact portion between the data line and the contact electrode is within an area to be sealed by a sealant upon joining of the first substrate with the second substrate.

14. The device as claimed in claim 1, further comprising:

a data pad formed of a transparent conductive layer in the contact hole passing through the gate insulating film connected to the data line, wherein the data pad borders with the gate insulating film and encloses the contact hole.

15. The device as claimed in claim 1, further comprising a data pad formed of a transparent conductive layer on the gate insulating film connected to the data line.

16. The device as claimed in claim 14, wherein the data line is within an area to be sealed by a sealant upon joining of the first substrate and the second substrate.

17. The device as claimed in claim 15, wherein the data line is within an area to be sealed by a sealant upon joining of the first substrate and the second substrate.

18. The device as claimed in claim 1, wherein the channel of the thin film transistor includes a surface layer oxidized by a plasma surface treatment.

19. The device as claimed in claim 1, wherein the data line, the source electrode, and the drain electrode have a source and drain metal pattern.

20. The device as claimed in claim 19, wherein the semiconductor layer and the source and drain metal pattern together have a shape.

21. The device as claimed in claim 7, further comprising a protective film on the first substrate where the protective film has an opening at a pad area.

22. The device as claimed in claim 21, further comprising an alignment film on the protective film.

23. The device as claimed in claim 22, wherein the protective film has the same pattern as the alignment film.

24. The device as claimed in claim 14, further comprising a protective film on the first substrate where the protective film has an opening at a pad area.

25. The device as claimed in claim 24, further comprising an alignment film on the protective film.

26. The device as claimed in claim 25, wherein the protective film has the same pattern as the alignment film.

27. The device as claimed in claim 15, further comprising a protective film on the first substrate where the protective film has an opening at a pad area.

28. The device as claimed in claim 27, further comprising an alignment film on the protective film.

29. The device as claimed in claim 28, wherein the protective film has the same pattern as the alignment film.

30. The device as claimed in claim 7, further comprising a protective film on the first substrate, the protective film has the same pattern as the second substrate and is opened at a pad area.

31. The device as claimed in claim 14, further comprising a protective film on the first substrate, the protective film has the same pattern as the second substrate and is opened at a pad area.

32. The device as claimed in claim 15, further comprising a protective film on the first substrate, the protective film has the same pattern as the second substrate and is opened at a pad area.

33. The device as claimed in claim 1, further comprising a liquid crystal layer between the first and second substrates.

34. A method of fabricating a liquid crystal display device, comprising: providing first and second substrates; a first mask process of forming a first mask pattern group including a gate line, a gate electrode, a common line, and a common electrode on the first substrate; a second mask process including forming a gate insulating film on the first mask pattern group and a semiconductor layer, defining a pixel hole passing through the semiconductor layer at a pixel area, and forming a pixel electrode in the pixel hole; and a third mask process including forming a source/drain metal pattern including a data line crossing the gate line to define the pixel area, a source electrode, and a drain electrode on the first substrate, and exposing an active layer of the semiconductor pattern to define a channel between the source electrode and the drain electrode wherein the drain electrode is overlapped with a portion of the common electrode to form a storage capacitor, and the common electrode includes a horizontal part overlapped with the drain electrode and a plurality of finger parts extending from the horizontal part and connected to the common line, and wherein the drain electrode overlaps with the pixel electrode to connect to the pixel electrode where the drain electrode overlaps the common electrode.

35. The method as claimed in claim 34, wherein the gate line, the gate electrode, and the common line have at least two conductive layers including a transparent conductive layer, and the common electrode is formed as an extension of the transparent conductive layer of the common line.

36. The method as claimed in claim 34, wherein the pixel electrode overlaps the common line.

37. The method as claimed in claim 34, wherein the first mask process comprises:

forming the at least two conductive layer on the first substrate;

forming photo-resist patterns having a different thicknesses using photolithography using a partial transmitting mask;

forming the first mask pattern group including the common electrode by an etching using the photo-resist pattern; and etching the common electrode to remain a transparent conductive layer.

38. The method as claimed in claim 34, wherein the third mask process includes the semiconductor layer to overlap with the pixel electrode.

39. The method as claimed in claim 38, wherein the semiconductor layer overlaps except for an overlapping portion between the source and drain pattern and the pixel electrode.

40. The method as claimed in claim 34, wherein the third mask process includes:
- forming a source and drain metal pattern including a data line and a drain electrode being integral to the source electrode on the first substrate;
- etching a semiconductor layer exposed through the source and drain metal pattern; and
- exposing the active layer between the source electrode and the drain electrode and to define the channel.

41. The method as claimed in claim 34, wherein the third mask process includes:
- forming a source and drain metal layer on the first substrate and forming photo-resist patterns having different thicknesses thereon;
- patterning the source and drain metal layer using the photo-resist patterns including the data line and the drain electrode;
- etching a semiconductor layer exposed through the photo-resist patterns; and
- exposing the active layer between the source electrode and the drain electrode through the photo-resist patterns to form the channel.

42. The method as claimed in claim 34, wherein:
- the first mask process further includes forming a lower pad electrode connected to at least one of the gate line and the common line, and
- the second mask process further includes forming a contact hole for exposing the lower pad electrode and forming an upper pad electrode connected to the lower pad electrode in the contact hole.

43. The method as claimed in claim 34, wherein:
- the first mask process further includes forming a data link and a lower pad electrode connected to the data line on the first substrate; and
- the second mask process further includes forming first and second contact holes to expose the lower pad electrode and the data link, and forming an upper pad electrode connected to the lower pad electrode and a contact electrode connected to the data link and the data line in the corresponding contact hole.

44. The method as claimed in claim 43, wherein the first contact hole with the upper pad electrode extends along the data link to be integral to the second contact hole and the upper pad electrode is integral to the contact electrode.

45. The method as claimed in claim 42, wherein a transparent conductive pattern including at least one of the upper pad electrode and the contact electrode borders with the gate insulating film enclosing the corresponding hole.

46. The method as claimed in claim 43, wherein a transparent conductive pattern including at least one of the upper pad electrode and the contact electrode borders with the gate insulating film enclosing the corresponding hole.

47. The method as claimed in claim 43, wherein a contact area between the data line and the contact electrode is within an area to be sealed by a sealant upon joining of the first substrate and the second substrate.

48. The method as claimed in claim 44, wherein a contact area between the data line and the contact electrode is within an area to be sealed by a sealant upon joining of the first substrate and the second substrate.

49. The method as claimed in claim 34, wherein the second mask process further includes:
- forming a contact hole passing through the semiconductor layer and the gate insulating film and to overlap the data line; and
- forming a pad connected to the data line in the contact hole.

50. The method as claimed in claim 49, wherein the pad borders with the gate insulating film enclosing the contact hole.

51. The method as claimed in claim 49, wherein the data line is within an area to be sealed by a sealant upon joining of the first substrate and the second substrate.

52. The method as claimed in claim 34, wherein the third mask process further includes surface treating the channel of the thin film transistor with plasma to oxidize the surface layer.

53. The method as claimed in claim 34, wherein the semiconductor layer and the source and drain metal pattern have a shape.

54. The method as claimed in claim 42, wherein the second mask process includes:
- forming a photo-resist pattern on the semiconductor layer;
- forming the pixel hole and the contact hole using the photo-resist pattern as a mask;
- forming a transparent conductive film on the photo-resist pattern, and forming the corresponding transparent conductive pattern in the pixel hole and the contact hole; and
- removing the photo-resist pattern formed with the transparent conductive film.

55. The method as claimed in claim 54, wherein the semiconductor layer and the gate insulating film are over-etched such that the edges of the pixel hole and the contact hole are positioned under the photo-resist pattern.

56. The method as claimed in claim 54, further comprising a fourth mask process of forming a protective film on the first substrate and with an opening at a pad area.

57. The method as claimed in claim 54, further comprising forming the protective film on the first substrate with the source/drain metal pattern so as to have an opening in the protective film at a pad area.

58. The method as claimed in claim 54, further comprising:
- forming the protective film on the first substrate with the source and drain metal pattern;
- forming an alignment film on the protective film; and
- removing the protective film at a pad area by an etching using the alignment film as a mask.

59. The method as claimed in claim 54, further comprising:
- forming a protective film on the first substrate;
- joining the second substrate to the first substrate by a sealant; and
- removing the protective film at a pad area by an etching using the second substrate as a mask, the protective film having an opening.

60. The method as claimed in claim 43, wherein the second mask process includes:
- forming a photo-resist pattern on the semiconductor layer;
- forming the pixel hole and the contact hole using the photo-resist pattern as a mask;
- forming a transparent conductive film on the photo-resist pattern, and forming the corresponding transparent conductive pattern in the pixel hole and the contact hole; and
- removing the photo-resist pattern formed with the transparent conductive film.

61. The method as claimed in claim 60, wherein the semiconductor layer and the gate insulating film are over-etched such that the edges of the pixel hole and the contact hole are positioned under the photo-resist pattern.

62. The method as claimed in claim 60, further comprising a fourth mask process of forming a protective film on the first substrate and with an opening at a pad area.

63. The method as claimed in claim 60, further comprising forming the protective film on the first substrate with the source/drain metal pattern so as to have an opening in the protective film at a pad area.

64. The method as claimed in claim 60, further comprising:
- forming the protective film on the first substrate with the source and drain metal pattern;
- forming an alignment film on the protective film; and
- removing the protective film at a pad area by an etching using the alignment film as a mask.

65. The method as claimed in claim 60, further comprising:
- forming a protective film on the first substrate;
- joining the second substrate to the first substrate by a sealant; and
- removing the protective film at a pad area by an etching using the second substrate as a mask, the protective film having an opening.

66. The method as claimed in claim 49, wherein the second mask process includes:
- forming a photo-resist pattern on the semiconductor layer;
- forming the pixel hole and the contact hole using the photo-resist pattern as a mask;
- forming a transparent conductive film on the photo-resist pattern, and forming the corresponding transparent conductive pattern in the pixel hole and the contact hole; and
- removing the photo-resist pattern formed with the transparent conductive film.

67. The method as claimed in claim 66, wherein the semiconductor layer and the gate insulating film are over-etched such that the edges of the pixel hole and the contact hole are positioned under the photo-resist pattern.

68. The method as claimed in claim 66, further comprising a fourth mask process of forming a protective film on the first substrate and with an opening at a pad area.

69. The method as claimed in claim 66, further comprising forming the protective film on the first substrate with the source/drain metal pattern so as to have an opening in the protective film at a pad area.

70. The method as claimed in claim 66, further comprising:
- forming the protective film on the first substrate with the source and drain metal pattern;
- forming an alignment film on the protective film; and
- removing the protective film at a pad area by an etching using the alignment film as a mask.

71. The method as claimed in claim 66, further comprising:
- forming a protective film on the first substrate;
- joining the second substrate to the first substrate by a sealant; and
- removing the protective film at a pad area by an etching using the second substrate as a mask, the protective film having an opening.

72. The method as claimed in claim 34, further comprising forming a liquid crystal layer between the first and second substrates.

* * * * *